United States Patent [19]

Hattori et al.

[11] Patent Number: 5,325,122
[45] Date of Patent: Jun. 28, 1994

[54] APPARATUS FOR FORMING DIGITAL IMAGES

[75] Inventors: Yoshihiro Hattori; Suguru Hamamichi, both of Toyokawa; Hideaki Kodama, Okazaki, all of Japan

[73] Assignee: Minolta Camera Kabushiki Kaisha, Osaka, Japan

[21] Appl. No.: 14,244

[22] Filed: Feb. 5, 1993

[30] Foreign Application Priority Data

Jul. 2, 1992 [JP] Japan .................. 4-022921

[51] Int. Cl.$^5$ .................. G01D 15/14; G03G 15/00
[52] U.S. Cl. .................. 346/160; 355/214; 358/505; 358/509
[58] Field of Search .................. 355/214, 326 R, 327; 346/157, 160; 358/501, 505, 509, 510

[56] References Cited

U.S. PATENT DOCUMENTS

| | | | |
|---|---|---|---|
| 4,226,525 | 10/1980 | Sakamoto et al. | 355/214 |
| 4,277,162 | 7/1981 | Kasahara et al. | 355/208 |
| 4,679,057 | 7/1987 | Hamada | 346/76 L |
| 4,768,043 | 8/1988 | Saito et al. | 346/160 X |
| 4,816,924 | 3/1989 | Sekiya | 358/296 |
| 4,873,428 | 10/1989 | Takeuchi et al. | 250/214 DC |
| 4,894,685 | 1/1990 | Shoji | 355/246 |
| 4,914,459 | 4/1990 | Mama et al. | 346/160 |
| 4,945,423 | 7/1990 | Takanashi et al. | 346/160 X |
| 4,950,889 | 8/1990 | Budd et al. | 346/160 X |
| 4,963,900 | 10/1990 | Budd et al. | 346/160 |
| 5,061,949 | 10/1991 | Ogino et al. | 346/160 |
| 5,148,289 | 9/1992 | Nishiyamao et al. | 346/160 X |
| 5,206,686 | 4/1993 | Fukui et al. | 355/208 |

FOREIGN PATENT DOCUMENTS

| | | |
|---|---|---|
| 55-15169 | 2/1980 | Japan . |
| 60-68316 | 4/1985 | Japan . |
| 60-68358 | 4/1985 | Japan . |
| 61-25164 | 2/1986 | Japan . |
| 2-72979 | 3/1990 | Japan . |
| 3-136018 | 6/1991 | Japan . |

Primary Examiner—Fred L. Braun
Attorney, Agent, or Firm—Burns, Doane, Swecker & Mathis

[57] ABSTRACT

A digital half-tone image is reproduced by exposing a photoconductor by modulating the intensity of laser beam. In order to correct the effect of the size of laser beam on the gradation characteristic, the surface potential of the photoconductor is detected under various conditions. The sensitizing potential and the sensitivity of the photoconductor are corrected according to the measured values for stabilizing the gradation potential. Then, the beam size is corrected according to the surface potential or the amount of adhered toners detected under prescribed conditions, without detecting the beam size.

12 Claims, 26 Drawing Sheets

→ distance in the subscan direction
(1/300 inch)

Fig. 5
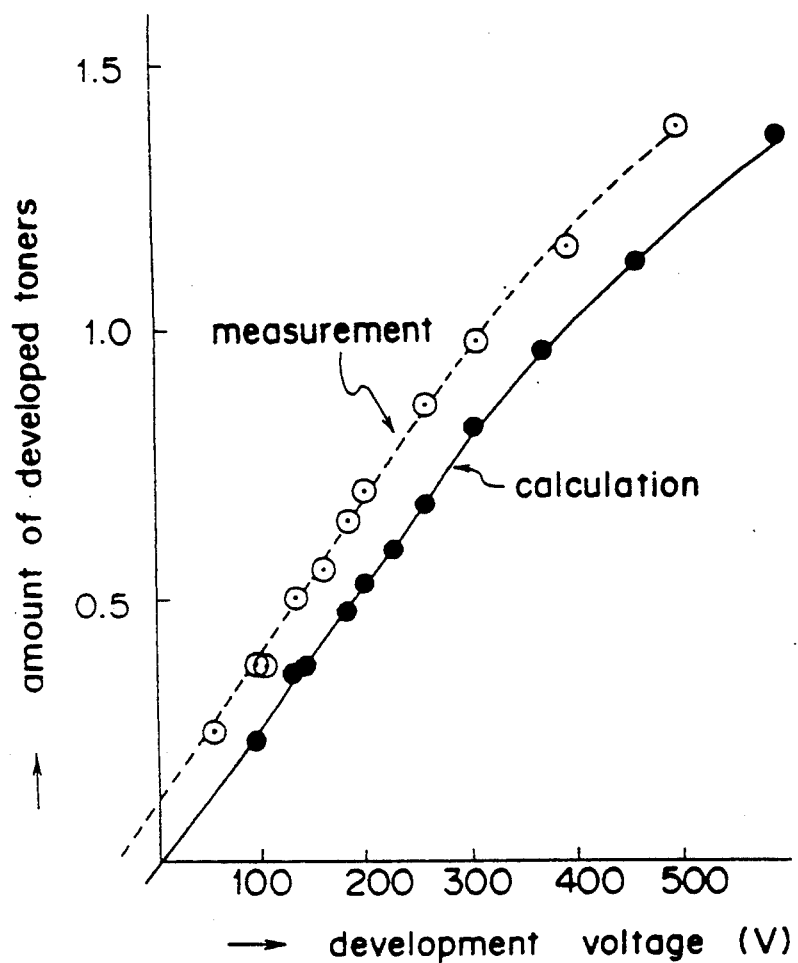
Fig. 6a
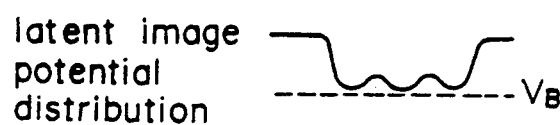
Fig. 6b
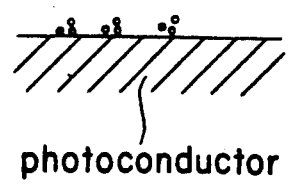

APPARATUS FOR FORMING DIGITAL IMAGES

BACKGROUND OF THE INVENTION

1. Field of the Invention

The present invention relates to an apparatus and a method for forming a digital image with use of light intensity modulation in an electrophotographic process.

2. Description of the Prior Art

In a digital printer and the like with use of an electrophotographic process, a laser beam is modulated according to multi-level image data to expose a photoconductor sensitized uniformly, to form an electrostatic latent image. The latent image is developed with toners, and the resultant toner image is transferred to a paper. Thus, the image data is reproduced on the paper.

In a method of forming a digital image, the intensity of laser beam is modulated according to multi-level image data to express gradation. In this method, the size of laser beam is kept constant.

However, the beam size varies with the type of laser diode used for the exposure. In U.S. patent application Ser. No. 671,963, the beam size of laser diode is coded, and the coding is performed in a factory before shipment. The beam size (code input) of a laser diode installed in an apparatus is detected, and the gradation correction data is corrected according to the detected beam size.

A latent image formed with the laser beam is an analog image, and the gradation characteristic depends largely on the size of laser beam. The size varies with the environment and the like of the electrophotographic process. Therefore, it is desirable that gradation characteristic is corrected according to the beam size.

The beam size can be changed for example by using a beam expander disclosed in Japanese Patent laid open Publication No. 68,316/1985. It can also be changed with a slit (Japanese Patent laid open Publication No. 72,979/1991) or with an electro-optic ceramic plate (Japanese Patent laid open Publication No. 136,018/1991). However, these methods are difficult to be used practically because the beam size and the change thereof are various according to the installation precision and the control method. Further, the shape of the beam does not necessarily become the same as the beam spot focused on the photoconductor when the beam is detected with a sensor located at a place different from the photoconductor.

Then, it is considered good that the beam size is corrected, without detecting the beam size, by deciding the effect of the beam size on the gradation characteristic from the potential of an exposed image on the photoconductor and the state of the image after the development. However, in this case, it is difficult to correct the effect of the beam size by separating the effect of the beam size from the changes of the photoconductor characteristic and the development characteristic.

SUMMARY OF THE INVENTION

An object of the present invention is to provide a digital image forming method for forming a digital image with light intensity modulation in an electrophotographic process, which apparatus and method being able to correct the effect of the beam size on the gradation characteristic without detecting the beam size.

In one aspect of the present invention of an apparatus for reproducing a digital half-tone image by exposing a photoconductor under the laser intensity modulation, the surface potential of the photoconductor exposed with the laser beam is detected and the beam size is changed for correcting the effect of beam size on gradation correction according to the detected surface potential until the detected surface potential attains to the surface potential expected when the photoconductor is exposed with a beam of a desired size.

In another aspect of the present invention, a photoconductor sensitized at a prescribed uniform voltage is exposed at a quantity of light, and the latent image on the photoconductor is developed with toners. The density of the developed image is detected and the beam size is changed for correcting the effect of beam size on gradation correction according to the detected density of the developed image.

An advantage of the present invention is that the gradation characteristic can be stabilized against the change of the beam size in the light intensity modulation, without detecting beam size.

Another advantage of the present invention is that the gradation correction characteristic at low densities can be controlled correctly so that impure colors and false contours can be reduced and the fine gradation can be reproduced at low densities.

BRIEF DESCRIPTION OF THE DRAWINGS

These and other objects and features of the present invention will become clear from the following description taken in conjunction with the preferred embodiments thereof with reference to the accompanying drawings, and in which:

FIG. 5 is a graph of development characteristic;

FIGS. 6a and 6b are a schematic diagram of the distribution of the potential of latent image when the same exposure power but of different beam size is given to a photoconductor;

DETAILED DESCRIPTION OF THE PREFERRED EMBODIMENTS

Figure 1:
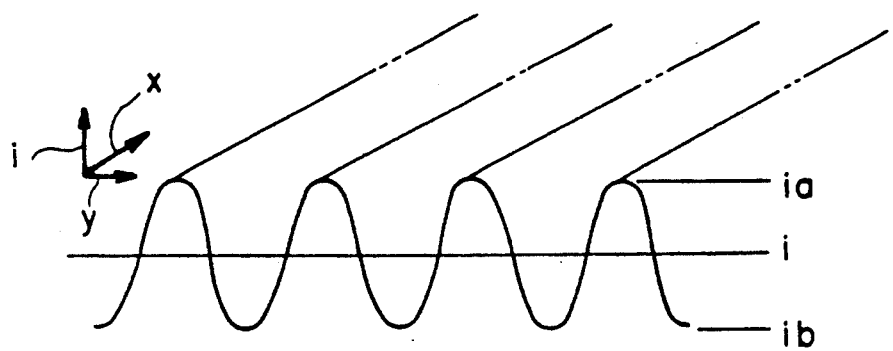
FIG. 1 is a schematic diagram of the distribution of the quantity of light on the photoconductor.

Referring now to the drawings, wherein like reference characters designate like or corresponding parts throughout the several views, embodiments of the present invention will be explained below in the following order:

(A) Exposure in intensity modulation and gradation correction
(B) Gradation characteristic and beam size
(C) Automatic density control in electrophotographic process of inversion development
(D) Beam size control
  (D-1) First beam size control method
  (D-2) Second beam size control method
  (D-3) Determination of development efficiency
(E) Structure of digital color copying machine
(F) Image signal processing
(G) Flow of printer control
  (G-1) Main flow
  (G-2) Sensor input
  (G-3) First method of beam size control
  (G-4) Second methods of beam size control
  (G-5) Measurement of development efficiency

(A) EXPOSURE IN INTENSITY MODULATION AND GRADATION CORRECTION

The gradation characteristic has to be taken into account for reproducing a half-tone image. In a printer with use of an electrophotographic process, the read level (input level) of an image of a document to be reproduced is not proportional to the intensity level of laser beam (or image density level of reproduced image) generally due to many factors such as the photosensitive characteristic of the photoconductor, the toner characteristic, the environment and the like, and this nonlinearity is called as gamma characteristic or gradation characteristic. The gamma characteristic is a large factor which deteriorates the fidelity in the reproduction of a half-tone image.

It is explained below that the gradation characteristic in the intensity modulation method for exposure is determined by residual potential $V_R$, sensitivity constant "k" and light quantity distribution constant "a".

When the photoconductor is exposed uniformly, the optical attenuation curve of the potential $V_{const}$ of the photoconductor is expressed generally by the following equation:

$$V_{const} = V(i) \qquad (1)$$
$$= (V_0 - V_R)\exp(-i/k) + V_R,$$

wherein "i" denotes the average quantity of exposure light, $V_0$ denotes the sensitized potential, $V_R$ denotes the residual potential of latent image and "k" denotes the sensitivity constant which represents the attenuation of the sensitized potential $V_0$ by light.

FIG. 1 shows the laser exposure schematically in the intensity modulation method when a photoconductor drum rotates in the direction of "y" at a subscan pitch of say 300 dots per inch while a laser beam scans the surface of the photoconductor in the main scan direction "x" continuously. Under the intensity modulation of exposure light, the distribution of the potential of the latent image is determined not only by the sensitivity constant "k", but also by the distribution of the distribution of exposure light in the subscan direction.

In the following, the latent half-tone image in the intensity modulation method of exposure light is analyzed by assuming that the distribution of the intensity of the laser spot of the beam has a Gaussian distribution. The analysis is easy in the points that the exposure light distribution is taken into account only in the subscan direction and that the shape of the laser spot does not change with the modulation.

The light quantity distribution $\rho(i, x, y)$ in the main scan direction "x" and in the subscan direction "y" is expressed by the following equation when the light quantity has an average "i".

$$\rho(i, x, y) = i\rho_a(y), \qquad (2)$$

wherein $\rho_a$ denotes the normalized light quantity distribution in the subscan direction. The distribution of latent image potential is obtained from the Eqs. 1 and 2.

$$V(i, y) = F(i\rho_a(y)). \qquad (3)$$

Figure 2:
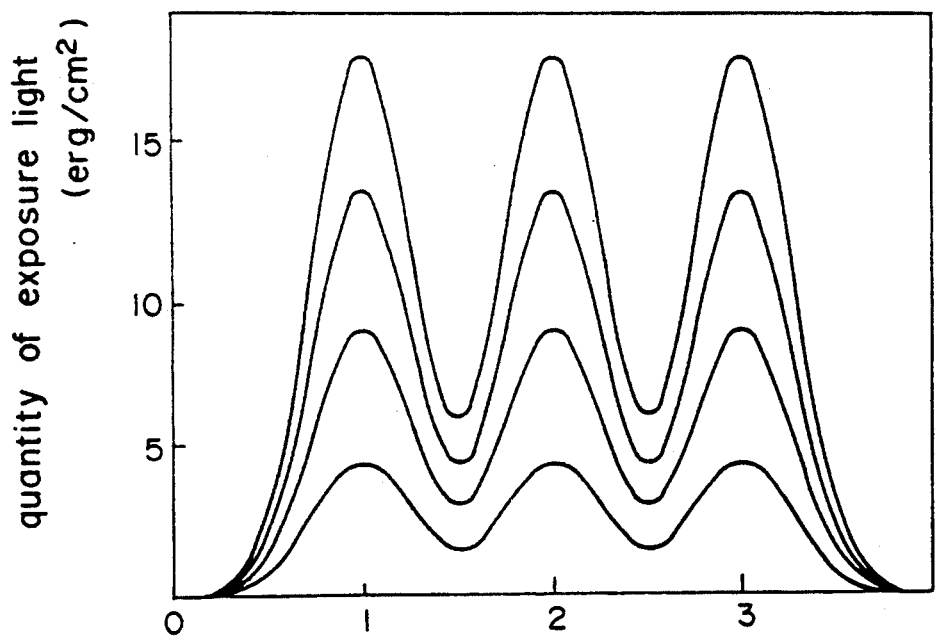
FIG. 2 is a schematic diagram of the calculated distribution of the quantity of light in the subscan direction on the photoconductor.
Figure 3:
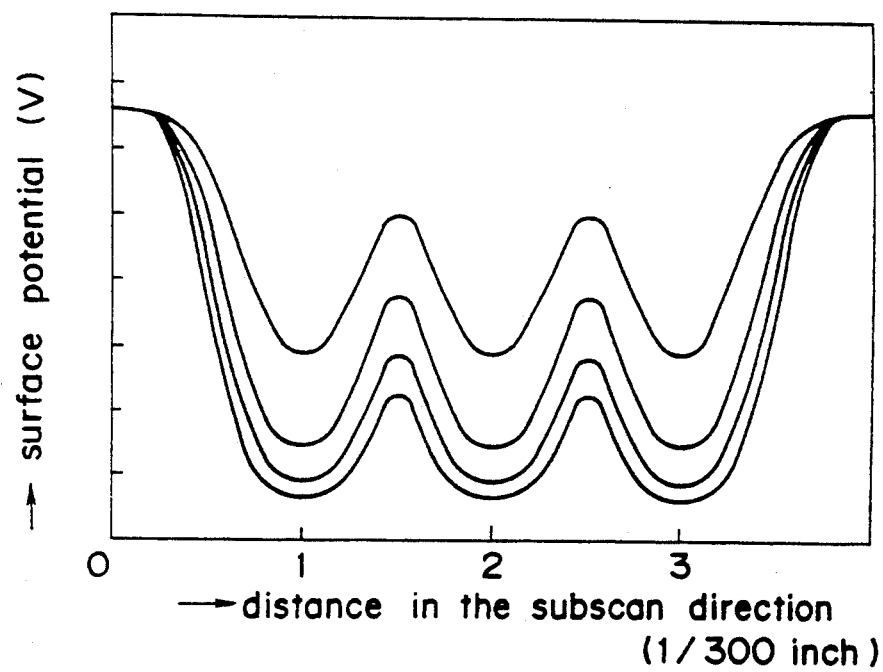
FIG. 3 is a diagram of the calculated potential of latent image in the subscan direction on the photoconductor.
Figure 4:
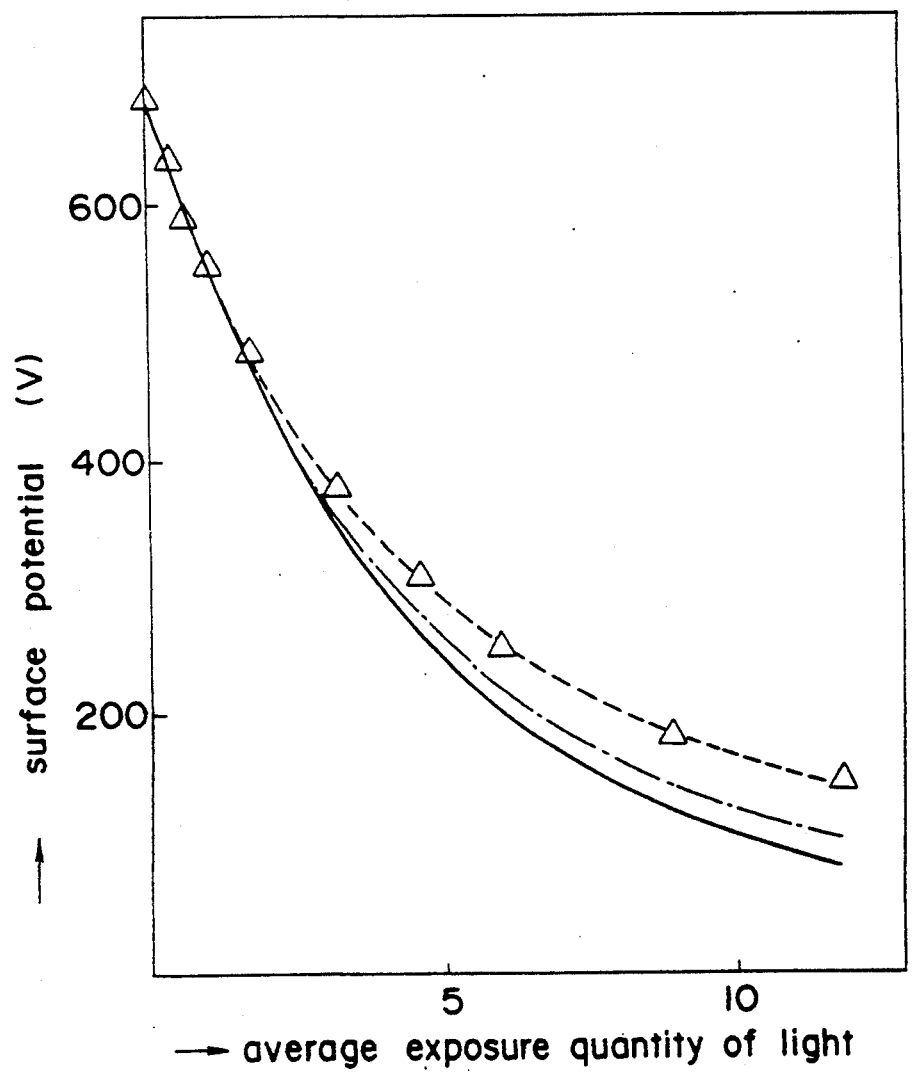
FIG. 4 is a diagram of attenuation curves plotted against the light intensity in various approximations.

FIG. 2 shows the results of the calculations of the light quantity distribution in the subscan direction y, while FIG. 3 shows the potential distribution of latent image. In FIG. 4, the average of the potential distribution of latent image of FIG. 3 is displayed as a dash and point line against the average quantity of light. On the other hand, triangle dots denotes observed values detected with an electrometer. That is, the average potential does not agree with the observed light attenuation curve. On the other hand, a dashed line in FIG. 4 shows an average of the maximum and minimum of the potential distribution of latent image, and it agrees well with the observed values plotted as triangle marks. It is confirmed that this holds also for the difference among respective photoconductors and for the difference among the spot diameters of laser beam. Thus, the "apparent" light attenuation curve in the light intensity modulation method can be approximated well by the following equation.

$$V_{ob}(i) = (F(ai) + F(bi))/2, \quad (4)$$

wherein "a" and "b" denote the maximum and the minimum in the light quantity distribution $\rho_d(y)$, respectively, which are determined by the laser spot size. In FIG. 4, a solid line which represents a light attenuation curve in case of uniform exposure is displayed for comparison.

On the other hand, a half-tone image does not have a texture under the light intensity modulation, and a half-tone image is determined only by the amount of adhered toners. As a parameter which determines the amount of adhered toners, it is found that the development voltage obtained from the average of the potential distribution is more appropriate than the development voltage obtained from the "apparent" light attenuation curve ($V_I - V_B$), because the former is a line which passes the origin as shown in FIG. 5.

The optical attenuation curve obtained from the average of the potential distribution of latent image is called as the "effective" optical attenuation curve, and it is defined by the following equation wherein "d" denotes the pitch in the subscan direction.

$$V_{ef}(i) = 1/d \int_0^d F(i\rho_d(y))dy, \quad (5)$$

If the light quantity distribution function is approximated as a flat distribution from the maximum "a" to the minimum "b", the following approximate equation holds well:

$$V_{ef}(i) = 1/(a-b)i \int_b^a F(ix)dx. \quad (6)$$

The amount of toners adhered to a latent image under the light intensity modulation is determined as follows: (1) In a region wherein the latent image potential V(i, y) exceeds the development bias voltage $V_B$, toners adhere to the region in proportion to the development voltage V(i, y) $- V_B$. (2) In a region wherein the latent image potential V(i, y) does not exceed the development bias voltage $V_B$, toners do not adhere to the region, or the development voltage can be regarded to be zero. Thus, the effective development voltage $\Delta V_{ef}$ is defined so as to determine the development voltage distribution from the effective optical attenuation curve according to the above-mentioned Eqs. 1 and 2. The effective development voltage $\Delta V_{ef}$ determines the amount of developed toners. The development starts when the potential at the maximum "ai" of the exposure light quantity becomes smaller than the development bias voltage $V_B$. Toners adhere only to the areas where the latent image potential is larger than the development voltage while the potential at the minimum "bi" of the exposure light quantity is smaller than the development bias voltage $V_B$.

That is, the effective development quantity $\Delta V_{ef}$ can be expressed as the following Equations 7-9, wherein "c" denotes the light quantity so the V(c)=$V_B$:

If c>ai, $$\Delta V_{ef}(i) = 0. \quad (7)$$

If ai<c<bi, $$\Delta V_{ef}(i) = 1/(a-b)i \int_c^{ai} F(x)dx - V_B \quad (8)$$

If bi<c, $$\Delta V_{ef}(i) = V_{ef}(i) - V_B. \quad (9)$$

When the effective development potential $\Delta V_{ef}$ determined by Eqs. 7-9 is compared with the apparent development voltage, as to the gradation reproducibility, by changing the surface potential $V_o$ and the development bias voltage $V_B$, it is found that the effective development voltage $\Delta V_{ef}$ is a good parameter which determines the amount of developed toners. Especially, in the inversion development system wherein contrast is high, the gradation at low densities can be reproduced smoothly.

Eqs. 1 and 7-9 show that the effective development potential $\Delta V_{ef}$ is a function of the maximum "a", the minimum "b" of the light quantity distribution, the sensitivity constant "k" and the residual potential $V_R$. The maximum "a" and the minimum "b" depend on the beam size, and an approximation relation b=1−(a−1) holds in a wide range. Therefore, the two parameters of the optical system can be represented only by "a". In the following, the maximum "a" is called as the light quantity distribution constant.

As explained above, the gradation characteristic in the intensity modulation is determined by the residual potential $V_R$, the sensitivity constant "k" and the light quantity distribution constant "a". Further, the light quantity distribution constant "a" is a function of the size of laser beam.

(B) GRADUATION CHARACTERISTIC AND BEAM SIZE

The size of laser beam is one of the factors which affects the gradation characteristic. If the beam size becomes larger, an image at low densities becomes harder to be reproduced, and the amount of adhered toners for an image data increases. That is, the initial slope of the gradation characteristic curve at low densities becomes larger. This is ascribed to a characteristic of forming an electrostatic latent image under the laser intensity modulation.

FIG. 6 shows two examples of the distribution of the electrical potential of a latent image and of the adhesion of toners to the latent image in an inversion development system, wherein $V_B$ denotes development bias voltage. In the two examples, the laser beam irradiates three successive dots in the subscan direction at the same power but with a different beam size from each other. The amplitude of the distribution of the latent image potential varies with the beam size. The potential distribution changes logarithmically at positions far from the center. Then, even if the same exposure energy is given, the valley of the potential becomes deeper and the potential distribution becomes more logarithmic when the beam size becomes narrower. Therefore, toners begin to be adhered at a smaller exposure power, as shown in the right side in FIG. 6 wherein the beam size is narrower. On the contrary, in the left side in FIG. 6 wherein the beam size is thicker, toners do not adhere though the same exposure power is given to the photoconductor.

Figure 7A:
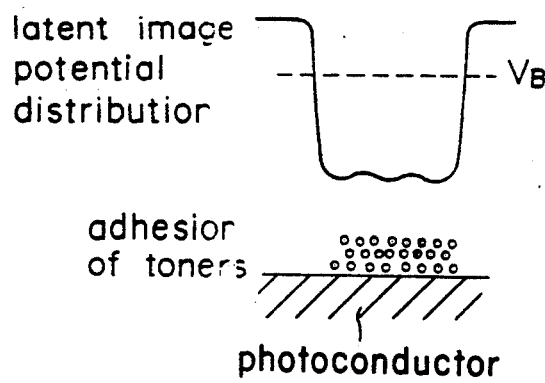
FIGS. 7a and 7b are a schematic diagram of the adherence of toners at a higher density than in FIG. 8.
Figure 7B:
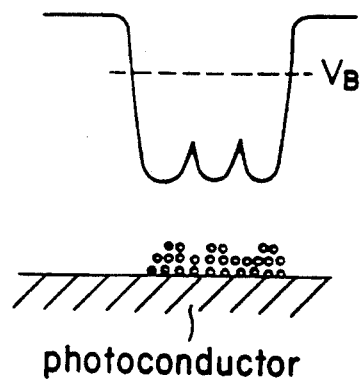

FIG. 7 shows a similar situation when a larger exposure power is given to the photoconductor. Toners adhere more at the left side of FIG. 7 wherein the beam size is thicker because the exposure is more uniform. On the contrary, at the right side of FIG. 7 wherein the beam size is narrower, bumps of the latent image potential appear due to the logarithmic distribution. The toner density is lower at the bumps and the total amount of adhered toners becomes smaller.

Figure 8:
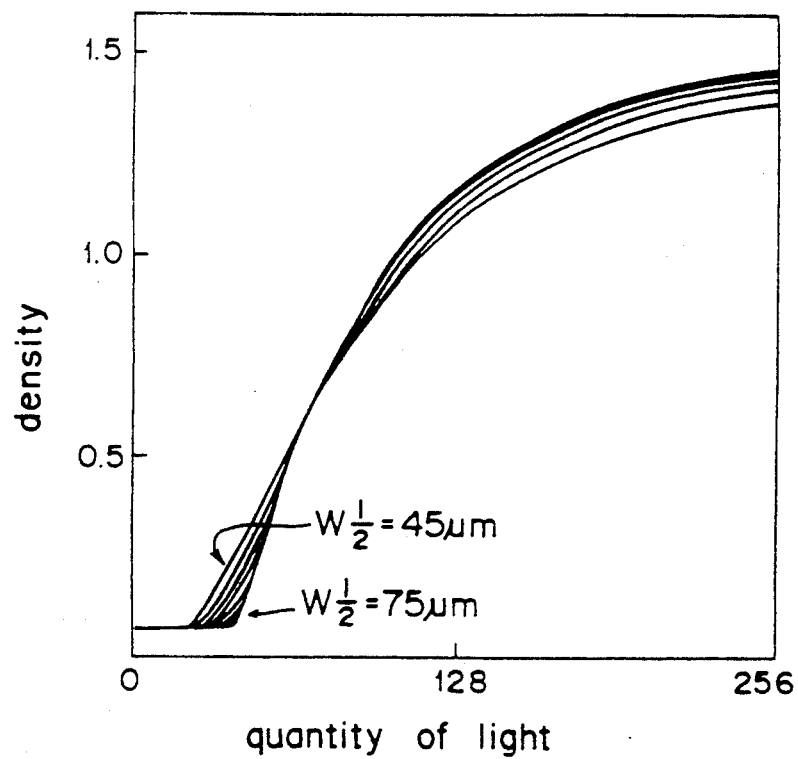
FIG. 8 is a graph of the gradation characteristic when the beam size $W_i$ is changed.

FIG. 8 shows a graph of the gradation characteristic (or the relation of the image density plotted against the exposure amount) when the beam size $W_1$ is changed at seven steps from 45 to 75 μm. The image density does not change at a certain intermediate quantity of light (level 72) irrespective of beam size, whereas it changes at a region of lower quantity of light and at a region of higher quantity of light. If the beam size becomes narrower, the initial slope at the origin of the gradation characteristic curve becomes larger, while the maximum density becomes smaller.

Figure 9:
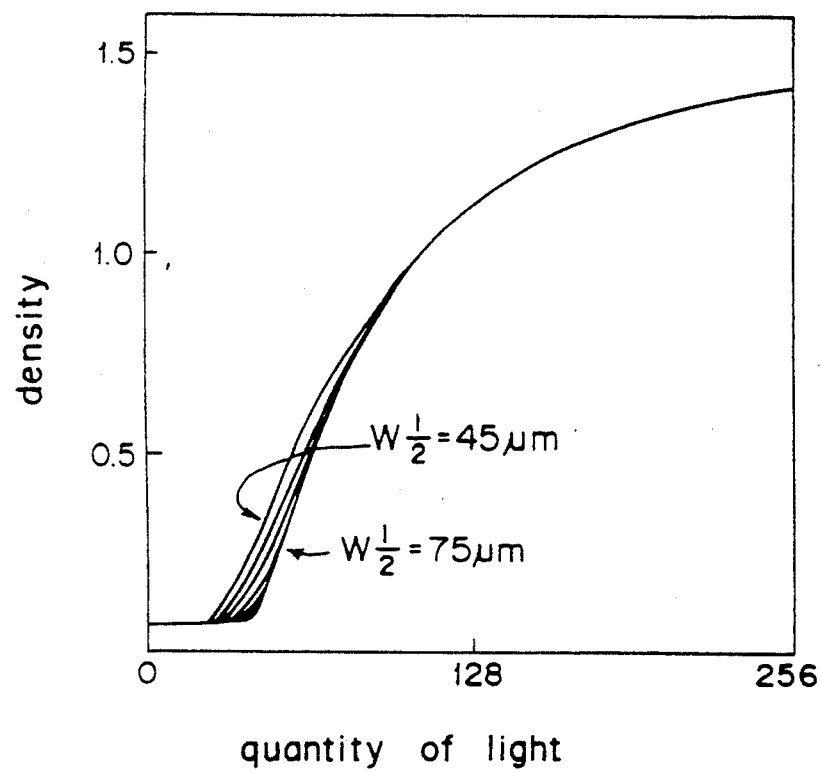
FIG. 9 is a graph of gradation characteristic when the maximum amount of adhered toners is controlled to be constant.

FIG. 9 shows a graph of the gradation characteristic when the maximum amount of adhered toners is controlled to be kept constant with an AIDC sensor as explained below. It is found that the gradation characteristic changes less than in case of FIG. 8, as expected, but the initial slope is found to be affected largely by the beam size.

(C) AUTOMATIC DENSITY CONTROL IN ELECTROPHOTOGRAPHIC PROCESS OF INVERSION DEVELOPMENT

Next, the automatic density control is explained. In the automatic density control, the toner density of a standard toner image is detected with an AIDC sensor, and the image reproduction is controlled according to the detected density. The gradation correction is related closely to the automatic image density control.

Figure 10:
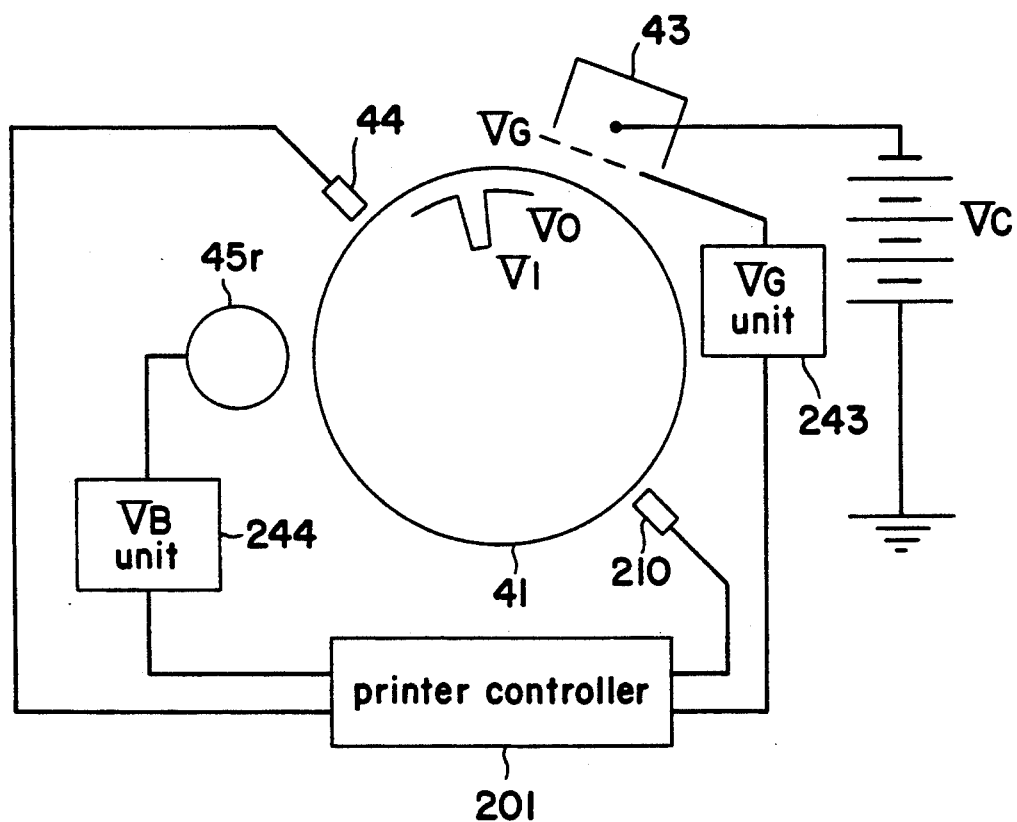
FIG. 10 is a schematic diagram around the photoconductor drum 41.

FIG. 10 illustrates a schematic diagram of image forming section including a photoconductor drum 41 and a roller of a development unit 45r. A sensitizing charger 43 of grid voltage $V_G$ (discharge voltage $V_C$) is arranged opposite to the photoconductor 41. The negative grid voltage $V_G$ is applied to the grid of the charger 43 by a grid voltage generator 243. The surface potential $V_o$ of the photoconductor just after the sensitization before the exposure can be taken almost equal to the grid voltage $V_G$. Therefore, the surface potential $V_o$ can be controlled by the grid voltage $V_G$, and the surface potential $V_o$ is detected by a $V_o$ sensor 44 which is an electrometer.

First, before the exposure of laser beam, a negative surface potential $V_o$ is applied to the photoconductor drum 41 by the sensitizing charger 43, while a negative, lower bias voltage $V_B$ ($|V_B| < |V_o|$) is applied to the roller of the development unit 45r by a development bias voltage generation unit 244. That is, the surface potential of the development sleeve is $V_B$.

A laser beam exposes the photoconductor, and the potential at the exposure position decreases from the surface potential $V_o$ to an attenuation potential $V_I$ of the electrostatic latent image or the surface potential just after the laser exposure. If the attenuation potential $V_I$ becomes lower than the development bias voltage $V_B$, the toners carried to the surface of the sleeve of the development unit 45r adhere to the photoconductor drum 41. It is not good that the difference between the surface potential $V_o$ and the development bias voltage $V_B$ is too large or too small. Further, the adhered amount of toners increases with increasing the development voltage $\Delta V = |V_B - V_I|$. On the other hand, the attenuation potential $V_I$ changes with the surface potential $V_o$ even at the same quantity of exposure light. Then, for example, the surface potential $V_o$ and the development bias voltage $V_B$ are changed by keeping the difference between the surface potential $V_o$ and the development bias voltage $V_B$ constant. Then, the difference between the development bias voltage $V_B$ and the attenuation potential $V_I$ changes or the adhered amount of toners can be changed to control the density.

This kind of density control is performed to keep the maximum density constant by changing the surface potential $V_o$ and the development bias voltage $V_B$ manually or automatically. In the automatic density control, a standard toner image for the density control is first formed on the surface of the photoconductor drum 41 in an area not used for forming a latent image, and the image reproduction density of the standard toner image is measured by detecting the quantity of reflection light with the AIDC sensor 210 arranged near the photoconductor drum 41. The value detected by the AIDC sensor 210 is received by a printer controller 201, which drives the $V_G$ generation unit 243 and the $V_B$ generation unit 244 to generate prescribed $V_G$ and $V_B$ values according to the detected value.

Next, the density control operation is explained. In the electrophotographic process of the inversion development, the image reproduction density can be controlled automatically with the surface potential $V_0$ of the photoconductor and the development bias voltage $V_B$. The surface potential $V_0$ is controlled with the grid voltage $V_G$ in the present embodiment, but it may also be controlled with a different means.

The amount of adhered toners of the standard toner image formed in the predetermined conditions is detected by the AIDC sensor 210. For example, the standard toner image is formed with 660 V of the grid voltage $V_G$, 420 V of the development bias voltage $V_B$, and 100 of the exposure level of laser diode. In the conditions called as image-forming conditions, the surface potential after the exposure is 300 V and the development voltage is 120 V. The signal detected by the AIDC sensor 210 is provided to the printer controller 201. In this embodiment, the conditions for forming a standard toner image is changed according to the measurement of the sensitivity of the photoconductor drum 41.

As shown in Table 1, the detection value of the AIDC sensor 210 is classified to density detection levels (LBA) 0-11 displayed in the left-most column according to the amplitude of the detection value. According to the density detection level LBA, the grid voltage $V_G$ is changed from 500 V to 1000 V and the development bias voltage $V_B$ is changed from 280 to 710 V. Table 1 shows an example of combinations ($V_B$, $V_o$) of the bias voltage $V_B$ of the development unit 45a-45d and the surface potential $V_o$ on the photoconductor drum 41. Though the development voltage $V_B$ is negative in this embodiment, it is expressed as absolute value in Table 1 for simplicity. In Table 1, "detected amount of adhered toners" is the amount of adhered toners measured with the AIDC sensor 210 on the standard toner image formed in the standard image-forming conditions, and "development efficiency" is defined as a ratio of the detected amount of toners to the development voltage. Further, the development voltage $\Delta V_d$ needed to realize a desired amount of adhered toners, called as prescribed development voltage, is defined as a ratio of the desired amount to the development efficiency. As displayed in Table 1, gamma correction tables T0–T11 are provided, and a gamma correction table is selected according to the density detection level (LBA).

TABLE 1

AIDC Table

| density detection level (LBA) | amount of adhered toners (mg/cm²) | development efficiency | ΔVd (V) | $V_G$ (V) | $V_o$ (V) | $V_B$ (V) | γ correction table |
|---|---|---|---|---|---|---|---|
| 0 | 0.625 | 0.00625 | 160 | 500 | 480 | 280 | T0 |
| 1 | 0.510 | 0.00510 | 195 | 540 | 520 | 320 | T1 |
| 2 | 0.455 | 0.00455 | 220 | 570 | 545 | 345 | T2 |
| 3 | 0.410 | 0.00410 | 245 | 600 | 570 | 370 | T3 |
| 4 | 0.385 | 0.00385 | 260 | 630 | 590 | 390 | T4 |
| 5 | 0.345 | 0.00345 | 290 | 660 | 620 | 420 | T5 |
| 6 | 0.310 | 0.00310 | 320 | 700 | 650 | 450 | T6 |
| 7 | 0.280 | 0.00280 | 355 | 740 | 690 | 490 | T7 |
| 8 | 0.260 | 0.00260 | 385 | 780 | 720 | 520 | T8 |
| 9 | 0.240 | 0.00240 | 420 | 830 | 760 | 560 | T9 |
| 10 | 0.210 | 0.00210 | 480 | 900 | 820 | 620 | T10 |
| 11 | 0.180 | 0.00180 | 560 | 1000 | 910 | 710 | T11 |

(D) BEAM SIZE CONTROL

Figure 11:
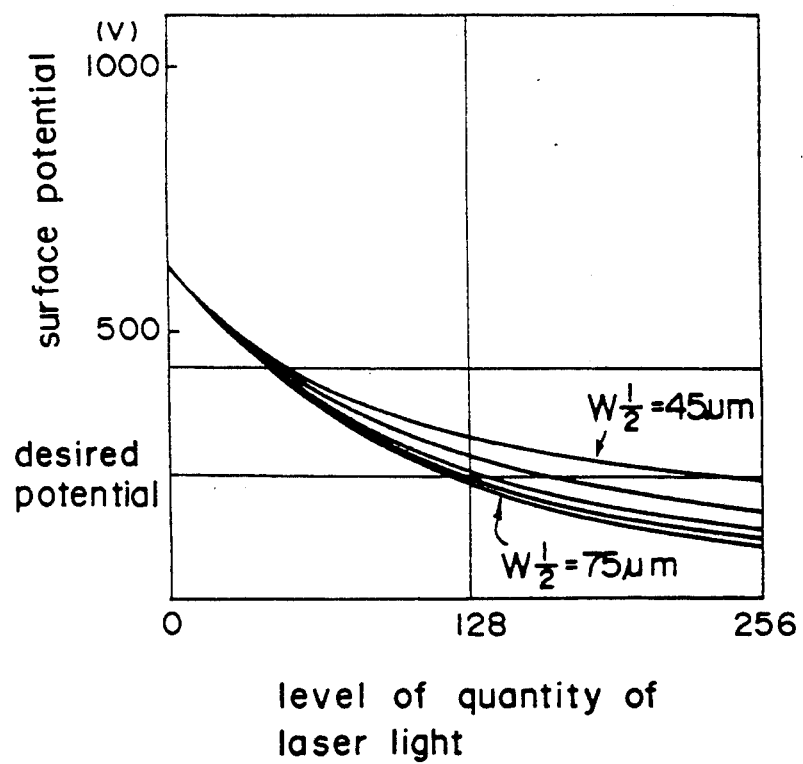
FIG. 11 is a graph of an example of the situation that the photoconductor sensitivity varies with beam size.

Though the effect of beam size on the gradation characteristic is not explained above, the gradation characteristic is also affected largely by the beam size. FIG. 11 shows an example how the surface potential of the photoconductor changes according to the beam size. It is clear that the dependence of the surface potential on the exposure level varies largely as the beam size increases from 45 to 74 μm. The object gradation characteristic curve to be realized is the curve in correspondence to 60 μm of beam size.

The effect of beam size on the gradation characteristic can be corrected by separating the effect on the photoconductor characteristic from that on the development characteristic. It is to be noted that the beam size is not needed to be detected for the correction.

As explained above, the gradation characteristic in the intensity modulation is determined by the residual potential $V_R$, the sensitivity constant "k" and the light quantity distribution constant (maximum) "a". Among them, the residual potential $V_R$ and the sensitivity constant "k" determines the sensitivity characteristic of the photoconductor, while the light quantity distribution constant "a" is a function of the optical system for laser beam. In the present embodiment, the surface potentials of the photoconductor after the exposure and after the development are measured, and they are used to correct the gradation characteristic.

(D-1) First Beam Size Control Method

Figure 12:
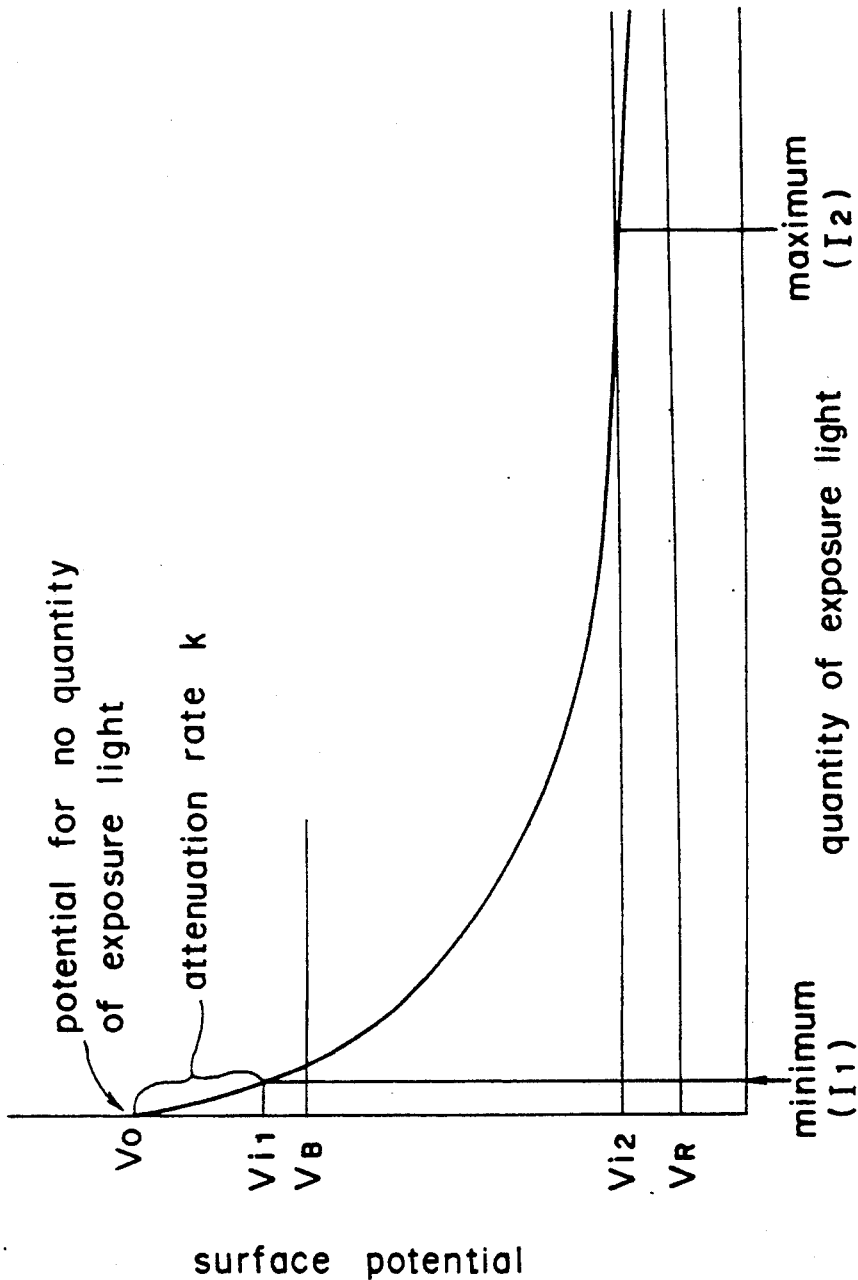
FIG. 12 is a diagram for illustrating the measurement of surface potential in various conditions.
Figure 13:
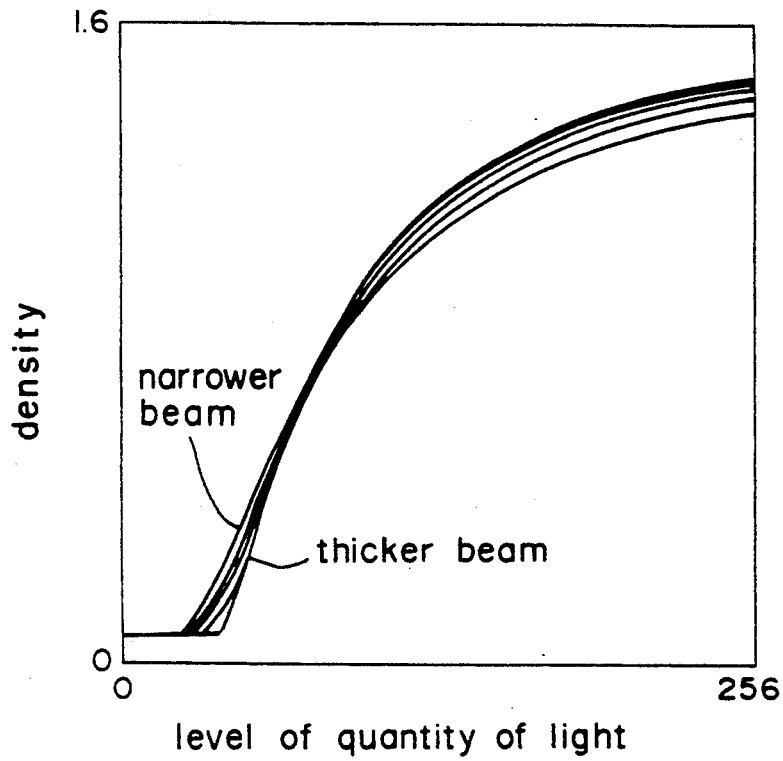
FIG. 13 is a graph on the effect of beam size on the gradation characteristic.
Figure 14:
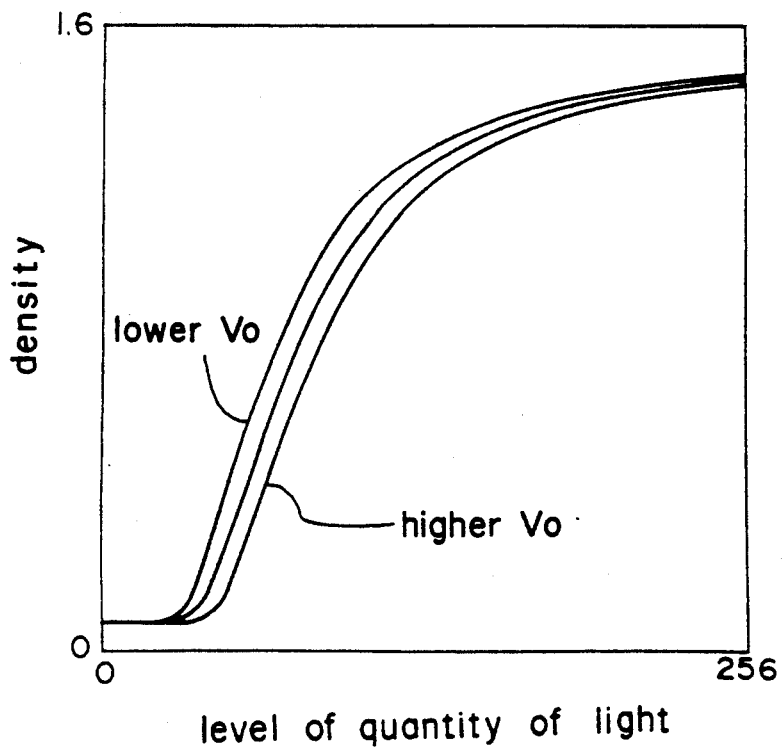
FIG. 14 is a graph of the effect of the surface potential $V_0$ on the gradation characteristic.
Figure 15:
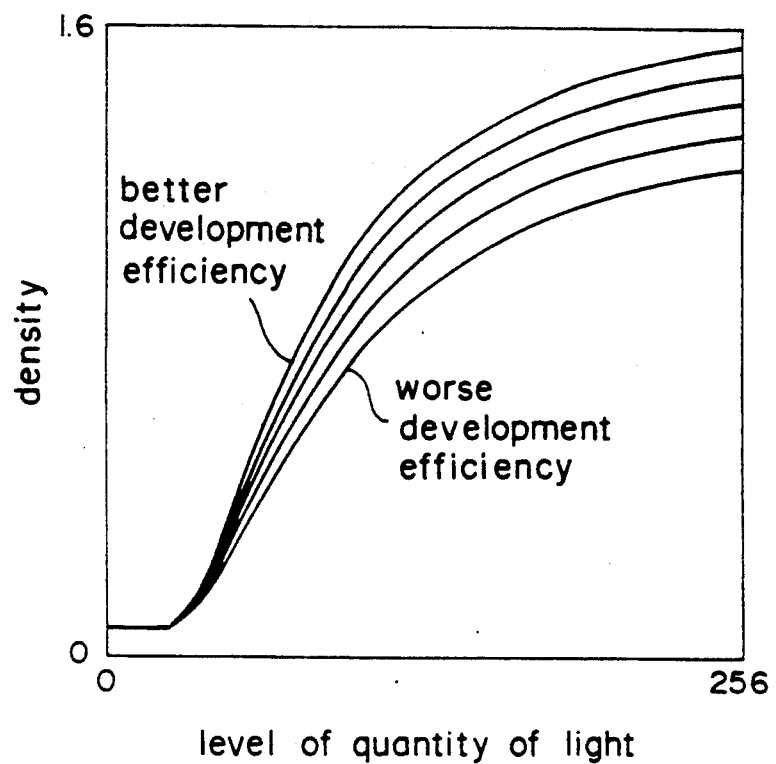
FIG. 15 is a graph of the effect of development efficiency on the gradation characteristic.
Figure 16:
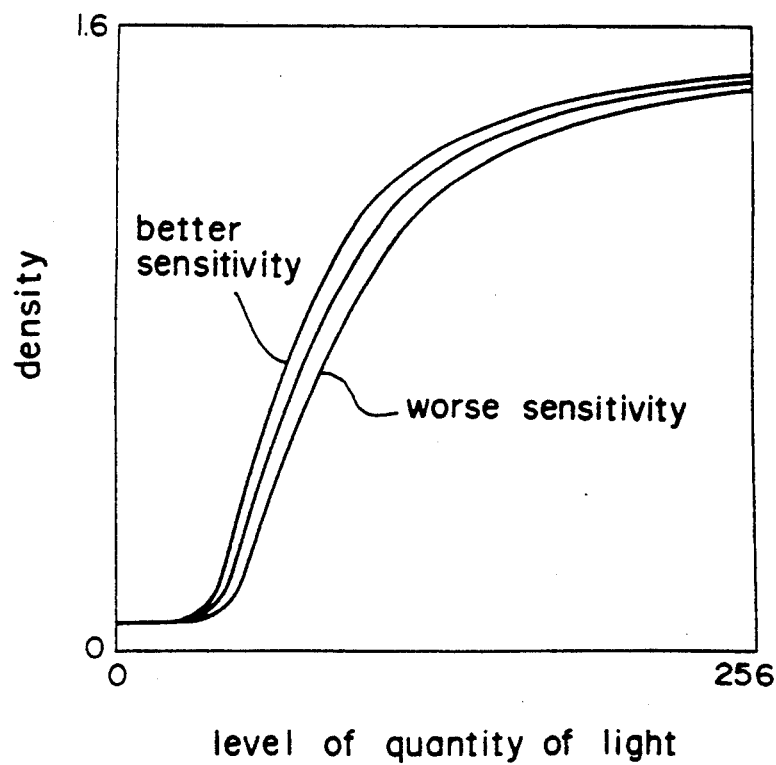
FIG. 16 is a graph of the effect of the photoconductor sensitivity on the gradation characteristic.

In this method, the potential of the photoconductor is measured with the $V_o$ sensor 44, and the residual potential $V_R$, the sensitivity constant "k" and light quantity distribution constant "a" are calculated (refer FIG. 12). If the sensitivity constant "k" changes, the beam size becomes difficult to be controlled with the surface potential. Then, a change of the sensitivity constant is first corrected with the light quantity distribution constant, and the beam size is changed next (refer FIG. 23).

(a-1) The grid voltage $V_G$ is changed according to the surface potential $V_o$ and the residual potential $V_R$ so as to make $V_o - V_R$ constant.

(a-2) The quantity of laser light is changed according to the sensitivity constant "k" to correct the effect of the change of the sensitivity constant.

(a-3) The development bias voltage $V_B$ is changed according to the residual potential $V_R$ to correct the effect of the change of the residual potential $V_R$. The gradation reproduction is stabilized after the above-mentioned steps.

Figure 24:
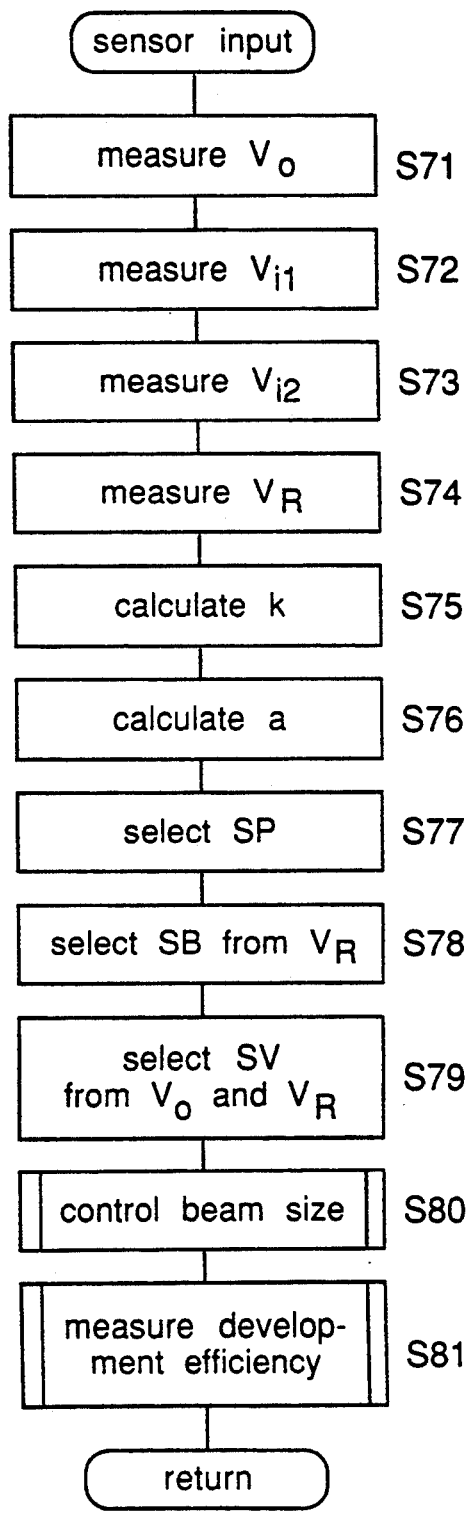
FIG. 24 is a flowchart of the sensor input processing.

(a-4) The beam size is changed according to the light quantity distribution constant "a" (refer FIG. 24).

In order to detect the change of the sensitivity characteristic by changing the beam size with the light quantity distribution constant "a", the surface potentials $V_0$, $V_{i1}$ and $V_{i2}$ are measured when the quantity of exposure light is zero, small and maximum, and the residual potential $V_R$ is measured under the zero grid voltage $V_G$. (FIG. 12 displays the situation of the measurements of the surface potentials.) Then, the sensitivity constant "k" is calculated by using Eq. 10, and the light quantity distribution constant "a" is obtained by using Eq. 11.

$$V_{i1} = (V_0 - V_R) \exp(-I_1/k) + V_R, \quad (10)$$

wherein $I_1$ denotes a small quantity of exposure light. It is desirable that the $I_1$ value is selected in a region wherein the measured surface potential is not affected by the beam size. Eq. 11 on the apparent optical attenuation characteristic reduces to Eq. 10 if $I_1 < k$ or if $\exp(-I_1/k)$ can be approximated as a linear equation, and Eq. 10 does not depends on the value of "a" or is not affected by the beam size. The linear relation holds until the surface potential attenuates from $V_0$ by 70% or $I_1 < 0.36\ k$.

$$V_{i2} = \tfrac{1}{2}(V_0 - V_R)\{\exp(-(2-1)I_2/k) + \exp(-a \cdot I_2/k)\} + V_R, \quad (11)$$

wherein $I_2$ denotes the maximum quantity of exposure light.

Next, a correction data SR for the grid voltage $V_G$ is obtained from Table 2 according to $V_0$ and $V_R$; a correction value SP for the quantity of light is obtained from Table 3 according to the sensitivity constant "k"; and the correction value SB for the development bias voltage $V_B$ is obtained form Table 4.

TABLE 2

| | SR Table | | | | |
|---|---|---|---|---|---|
| | | | $V_0$ | | |
| $V_R$ | 590 | 605 | 620 | 635 | 650 |
| 20 | 0 | −1 | −2 | −3 | −4 |

TABLE 2-continued

SR Table

| $V_R$ | $V_0$ | | | | |
|---|---|---|---|---|---|
| | 590 | 605 | 620 | 635 | 650 |
| 35 | +1 | 0 | −1 | −2 | −3 |
| 50 | +2 | +1 | 0 | −1 | −2 |
| 65 | +3 | +2 | +1 | 0 | −1 |
| 80 | +4 | +3 | +2 | +1 | 0 |

TABLE 3

SP Table

| k | SP | LD Power (mW) |
|---|---|---|
| 0.30 | 0 | 0.75 |
| 0.34 | 1 | 0.82 |
| 0.38 | 2 | 0.91 |
| 0.41 | 3 | 1.00 |
| 0.45 | 4 | 1.09 |
| 0.49 | 5 | 1.18 |
| 0.52 | 6 | 1.27 |
| 0.56 | 7 | 1.36 |

TABLE 4

SB Table

| $V_R$ | SB | $V_B$ |
|---|---|---|
| 20 | −2 | 11 |
| 35 | −1 | 12 |
| 50 | 0 | 13 |
| 65 | +1 | 14 |
| 80 | +2 | 15 |

Next, the light quantity distribution constant "a" is compared with a desired value "aa" of the light quantity distribution constant. If the "a" value is larger than the desired one, the beam is changed to become thicker because the beam is narrow, while if the "a" value is smaller than the desired one, the beam is changed to become narrower because the beam is thick.

Next, the grid voltage is corrected as $V_R'$ and the maximum quantity of light is also corrected according to the correction data SV and SP.

Further, the corrected grid voltage $V_R'$ is output, and the surface potential $V_0$ after the correction is measured and is denoted as $V_0'$. Then, the level (128 in FIG. 11) of the quantity of laser light is set, and the desired value $V_{i3a}$ of the potential after exposed at the level is calculated from Eq. 12 by using $V_0'$, "k", $V_R'$ and the light quantity distribution constant "a".

$$V_{i3a} = 1/2\,(V_0' - V_R) * \{\exp(-(2 - aa)(128/256)I_{max}/k) + \exp(-aa*(128/256)I_{max}/k)\} + V_R, \quad (12)$$

wherein $I_{max}$ denotes the maximum quantity of exposure light after the correction. Eq. 12 is derived by replacing $V_0'$, "aa" and $(128/256)I_{max}$ for $V_0$, "a" and $I_2$ in Eq. 11.

Next, the photoconductor is exposed at the level of the quantity of exposure light, a potential $V_{i3}$ after the exposure is measured.

If $|V_{i3}| > |V_{i3a}|$, the beam size is narrower than the desired value, otherwise the beam size is thicker than the desired value. If this decision is different from the above-mentioned decision on the "a" value, the beam size measured is not so different from the desired value, and the beam size is not changed.

If this decision coincides the above-mentioned decision, the stepping motor 267 for controlling the focus of the beam expander 268 for changing the beam size is moved by one step, and $V_{i3}$ is read again. This procedure is repeated until $V_{i3}$ reached the desired value $V_{i3a}$.

It is explained below why the level of the quantity of exposure light is set to be 128 in this beam size control. As is clear from FIG. 11, the potential at the maximum level (256) is affected most by the change of beam size. Therefore, it may be considered that it is better to measure the potential for the exposure at the maximum level. However, the maximum level is already used for the determination of "a", "k" and $V_R$. Then, if a level different from the maximum level is used this time, two level are used for the beam size control so that the errors become smaller and the precision is improved further. On the other hand, if the beam size is changed even for a small discrepancy, the beam size becomes unstable even under control. Then, it is preferable for a user that the beam size is not changed for a small discrepancy. Then, the two levels are used for the control, and the frequency of the beam size change is reduced.

(D-2) Second Beam Size Control Method

The precision of beam control can be improved further if the quantity "$a_s$" toners begin to be adhered while the quantity of light is increased. That is, the quantity "$a_s$" of light corresponds to a quantity of light at which the image reproduction starts. The gradation can be corrected surely because the beam size is controlled by taking the real reproducibility into account. That is, this method can correct both beam size and gradation characteristic precisely at the same time.

Following factors affect the quantity "$a_s$" of light and the initial slope of the gradation characteristic curve above "as":

beam size (for "$a_s$" and initial slope),
$V_0$ ($V_B$) (for "$a_s$"),
development efficiency (for initial slope), and
sensitivity constant (for "$a_s$" and initial slope).

The effects of these factors on the initial slope of the gradation characteristic curve at low densities have respective patterns, as shown in FIGS. 13–16. In the case of beam size shown in FIG. 13, the light quantity "$a_s$" increases and the initial slope becomes steeper as the beam size becomes thicker. In the case of $V_0$ shown in FIG. 14, "$a_s$" increases but the initial slope does not change as $V_0$ increases. In the case of development efficiency shown in FIG. 15, "$a_s$" does not change but the initial slope decreases as the development efficiency decreases. In the case of the sensitivity constant shown in FIG. 16, "$a_s$" increases while the initial slope decreases as the sensitivity becomes worse. Therefore, it is difficult to determine the cause only from the gradation when the four factors affect at the same time. Then, as will be explained below, it is better to get a sure conclusion by deciding with a combination with other measurements. Thus, the effect of beam size can be corrected separately from other factors.

In the second beam size control method, the surface potential and the sensitivity constant "k" are corrected first with the $V_0$ sensor as follows:

(b-1) The grid voltage $V_G$ is changed according to the surface potential $V_o$ and the residual potential $V_R$ so as to make $V_o - V_R$ constant.

(b-2) The quantity of laser light is changed according to the sensitivity constant "k" to correct the effect of the change of the sensitivity constant.

(b-3) The development bias voltage $V_B$ is changed according to the residual potential $V_R$ to correct the effect of the change of the residual potential $V_R$. The gradation reproduction can be stabilized after the above-mentioned steps.

Thus, $V_0$ and the sensitivity are corrected similarly to in the first beam size control method.

(b-4) Next, the light quantity "$a_s$" is set as the desired value "$a_{sm}$" to control the beam size. The value "$a_{sm}$" is the quantity of light at which toners begin to be adhered for the standard beam size when the level of the quantity of exposure light is increased. It is to be noted that the potential is equal to $V_B$ if the maximum $a_{sm}$*aa of the distribution of the quantity of exposure light of "$a_{sm}$" is replaced for "i" in Eq. 1.

(b-5) After the beam size is controlled, the development efficiency is obtained from the initial slope of the gradation correction curve at low densities. Then, the effect of the development efficiency is corrected. Thus, stable gradation can be realized.

(D-2-1)

Two methods can be used for the above-mentioned beam size control step (b4) based on "$a_s$".

The first method is explained below (refer FIGS. 26 and 27). First, a quantity of light "$a_{ss}$" is determined which is a little higher than the desired quantity of light "$a_{sm}$" at which toners begin to be adhered when the light intensity is increased.

Next, the density of an area on the photoconductor which is not exposed with light or the ground level is detected with the AIDC sensor 210, and a threshold level $V_{ss}=V_{so}+dV_s$ at which toners begin to be adhered is determined according to the detection voltage of the AIDC sensor 210. The value of $dV_s$ is set at a level which can prevent a malfunction by taking the S/N ratio of the AIDC sensor 210 into account.

Next, an amount of toners after developing the pattern exposed at the quantity of light "$a_{ss}$" is measured with the AIDC sensor 210, and the output $V_s$ of the AIDC sensor 210 is read. If the output $V_s$ is equal to or larger than the threshold level $V_{ss}$, the motor 267 which moves the beam expander 268 for beam size control is moved by one step to increase the beam size. Otherwise, the motor 267 is moved by one step in the reverse direction to decrease the beam size. If the step number of the motor 267 is changed according to the desired value, the beam size can be controlled faster.

(D-2-2)

The second beam control method to be explained next has a good precision because it is not affected by the development efficiency (refer FIGS. 28-30). First, a quantity of light "$a_{se}$" is determined which is less than the desired quantity of light "$a_{sm}$" at which toners begin to be adhered when the light intensity is increased. Next, the density of an area on the photoconductor which is not exposed with light or the ground level is detected with the AIDC sensor 210, and a threshold level $V_{ss}=V_{so}+dV_s$ at which toners begin to be adhered is determined according to the detection voltage of the AIDC sensor 210.

Next, the amounts of toners adhered to the latent image are read successively as the quantity of exposure light is increased by certain steps successively. The exposure is stopped after the quantity of light exceeds above the threshold level $V_{ss}$ by a few steps. Then, the quantity of level "$a_s$" at which a latent image is started to be reproduced is determined from the data for quantities of light above the threshold level. Next, the difference of the quantity of level "$a_s$" from the desired value "$a_{sm}$" is calculated, and the amount for moving the stepping motor 267 for the beam expander 268 is determined according to the difference. This procedure is repeated until the quantity of level "$a_s$" attains the desired value "$a_{sm}$" by moving the stepping motor 268 to change the beam size. The beam size control is stopped when the quantity of level "$a_s$" equals the desired value "$a_{sm}$".

(D-3) Determination of the Development Efficiency

As explained above, the development efficiency can be determined from the initial slope of the gradation correction curve after the beam size is controlled and the quantity of light for reproducing an image is corrected. An method to determine the development efficiency is explained below. As already shown in FIG. 15, when the development efficiency is changed, the quantity of level "$a_{sd}$" at which toners begin to be adhered does not change, but the initial slope changes. Therefore, the development efficiency can be determined from the slope of the sensor output at quantities of light exceeding "$a_{sd}$". The development efficiency is defined as a ratio of the amount of adhered toners (mg) to the development voltage (V). Then, it can be obtained if the sensor output is converted to the amount of adhered toners and the difference of the quantity of level is converted to the difference of the development voltage.

The relation of the quantity of level to the development voltage can be approximated as a linear line near the threshold level. As an example, the following relation is obtained:

$$\text{development voltage} = \Delta L^*(147/64), (V) \quad (13)$$

wherein $\Delta L$ denotes the difference of quantity of light.

The sensor output can also be approximated as a linear line at low amounts of adhered toners. In the above-mentioned example, the following relation is obtained:

$$\text{amount of adhered toners} = \Delta V^*(0.5/2.9), (\text{mg/cm}^2) \quad (14)$$

wherein $\Delta V$ denoted the difference of sensor output voltage.

Therefore, the development efficiency can be expressed as follows:

$$\text{development efficiency} = \quad (15)$$
$$(\Delta V/\Delta L)\,(0.5/2.9)/(2.9/147) \cdot (\text{mg/cm}^3 \cdot V)$$

That is, the development efficiency is derived from the initial slope of the sensor output.

After the development efficiency is obtained, the amount of adhered toners is corrected by using a table, as in the above-mentioned AIDC operation.

The initial slope of the sensor output is calculated as follows: In the most simple method, the sensor outputs $V_s(IA)$ and $V_s(IB)$ are measured at two quantities of light IA and IB above "$a_{sd}$" are measured, and the initial slope is calculated by using the following relation:

$$\text{initial slope of sensor output}$$
$$= (V_s(IA) - V_s(IB))/(IA - IB). \quad (16)$$

In order to improve the precision, the number of the measurement is increased, and the linear regression of a linear relation $V_s(I) = A*I + B$ is used. Practically, about three measurement points including "$a_{sd}$" is sufficient.

In the above-mentioned methods of beam size control, a change in beam size can be corrected, and an image can be reproduced stably.

Especially at the low densities, the gradation characteristic can be corrected precisely, the purity of a color is improved, and a false contour can be vanished. Further, the texture of color at low densities can be improved by using an appropriate beam size.

The effect of beam size on the gradation characteristic can be corrected without detecting the beam size directly.

(E) Structure of Digital Color Copying Machine

Figure 17:
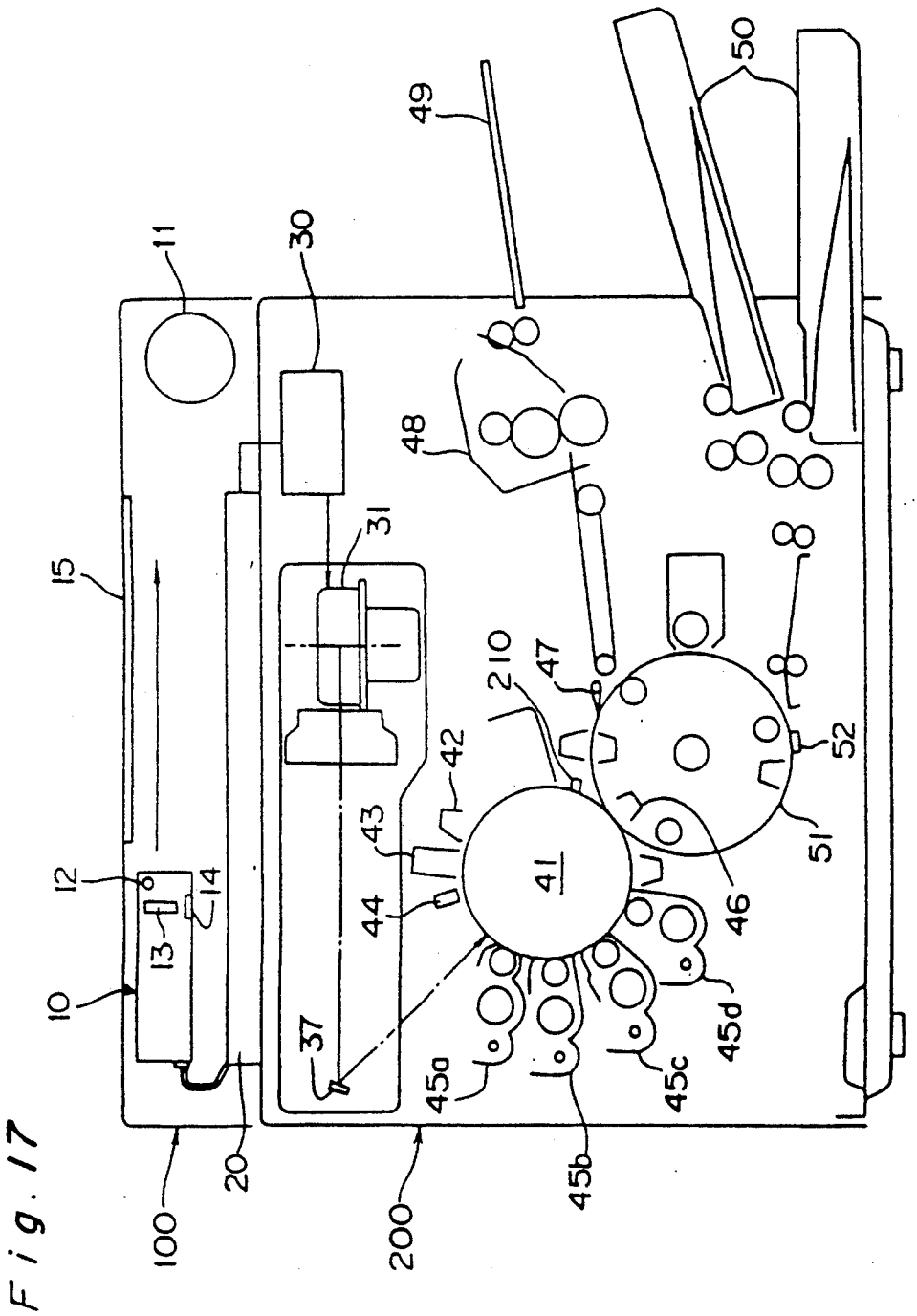
FIG. 17 is a sectional view of a digital color copying machine.

FIG. 17 shows a schematic structure of a digital color copying machine according to the present embodiment which consists mainly of an image reader 100 for reading a document image and a main body 200 for reproducing the document image.

In the image reader 100, a scanner includes an exposure lamp 12, a rod lens array 13 to collect reflection light from a document put on a platen 15 and a contact type CCD color image sensor 14 to convert the collected light to an electric signal. The scanner 10 is driven by a motor 11 to move in the direction (subscan direction) of the arrow shown in FIG. 24. The optical image of the document illuminated by the exposure lamp 12 is converted by the image sensor 14 into a multi-level electric signal of red (R), green (G) and blue (B). The electric signal is converted by the read signal processor 20 to multi-level digital image data of yellow (Y), magenta (M), cyan (C) or black (K).

Then, in the printer section 200, a print head 31 performs the above-mentioned gamma correction of the gradation data, and it converts the corrected data to a drive signal to drive a laser diode 224 (refer FIGS. 19 and 22) in the print head 31.

Figure 22:
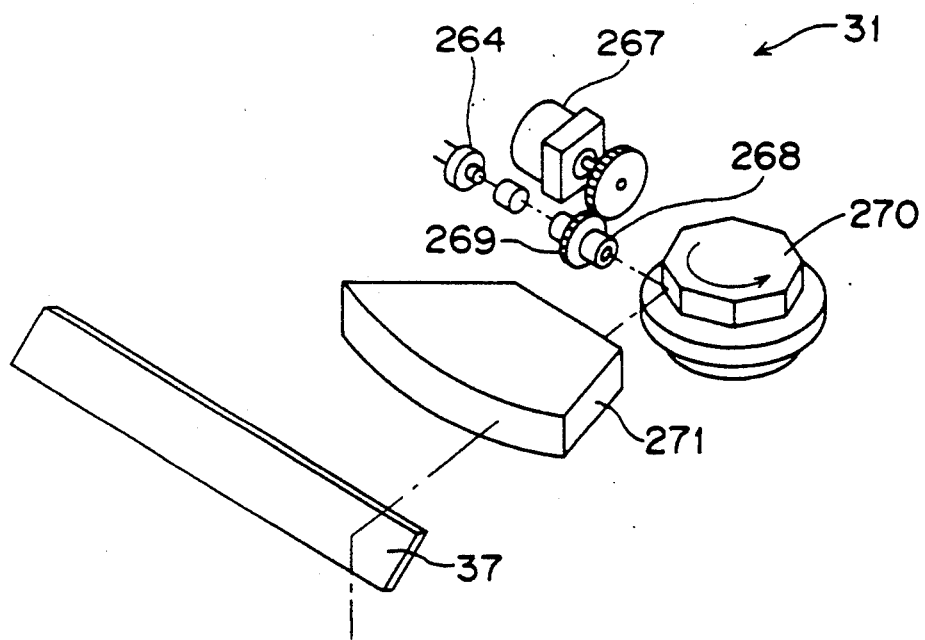
FIG. 22 is a perspective view of an optical system.

In order to control the beam size, a beam expander 268 shown in FIG. 22 is used (refer for example Japanese Patent laid open Publication No. 68,316/1985). In the beam expander 268, a laser beam of parallel light flux emitted from the laser diode 264 enters a ring 269 to expand the beam. A ratio of expansion is controlled by rotating the ring 269 with a stepping motor 267. The laser beam from the beam expander 268 is reflected by a polygon mirror 270. That is, the laser beam generated by the print head 31 of an intensity modulated in correspondence to gradation data propagates through the beam expander 268, the polygon mirror 270, the $f-\theta$ lens 271 and a mirror 37 to expose the photoconductor drum 41.

When an image of a document is formed on the photoconductor of the drum 41, the photoconductor drum 41 has been illuminated by an eraser lamp 42 and has been sensitized uniformly by a sensitizing charger 43 for each copy before the exposure. When the exposure is performed onto the photoconductor in the uniformly charged state, an electrostatic latent image is formed on the photoconductor drum 41. Then, one of development units 45a-45d of yellow, magenta, cyan and black toners is selected to develop the latent image. The developed image is transferred by a transfer charger 46 to a paper wound on a transfer drum 51.

The above-mentioned printing process is repeated four times for yellow, magenta, cyan and black. At this time, the scanner 10 repeats the scanning in synchronization with the motion of the photoconductor drum 41 and the transfer drum 51. Then, the paper is isolated from the transfer drum 51 with the operation of an isolation claw 47, the image is fixed by a fixer 48 and the paper is carried out to a paper tray 49. In this process, a paper is supplied from a paper cassette 50 and is chucked at the top of the paper by a chucking mechanism 52 on the transfer drum 51 in order to prevent a shift of position on the image transfer.

Figure 18:
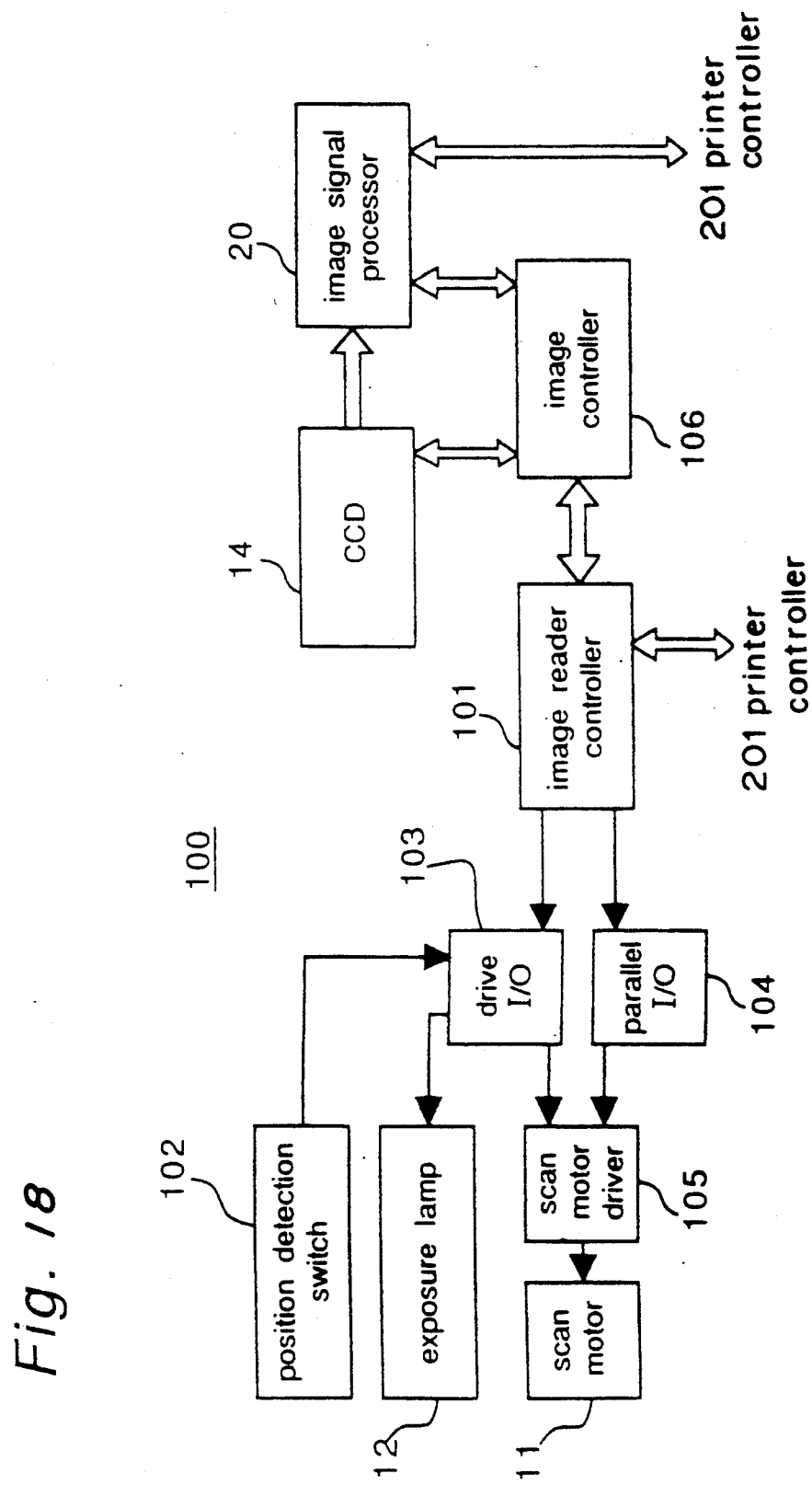
FIG. 18 is a block diagram of a part of the control system of the copying machine.
Figure 19:
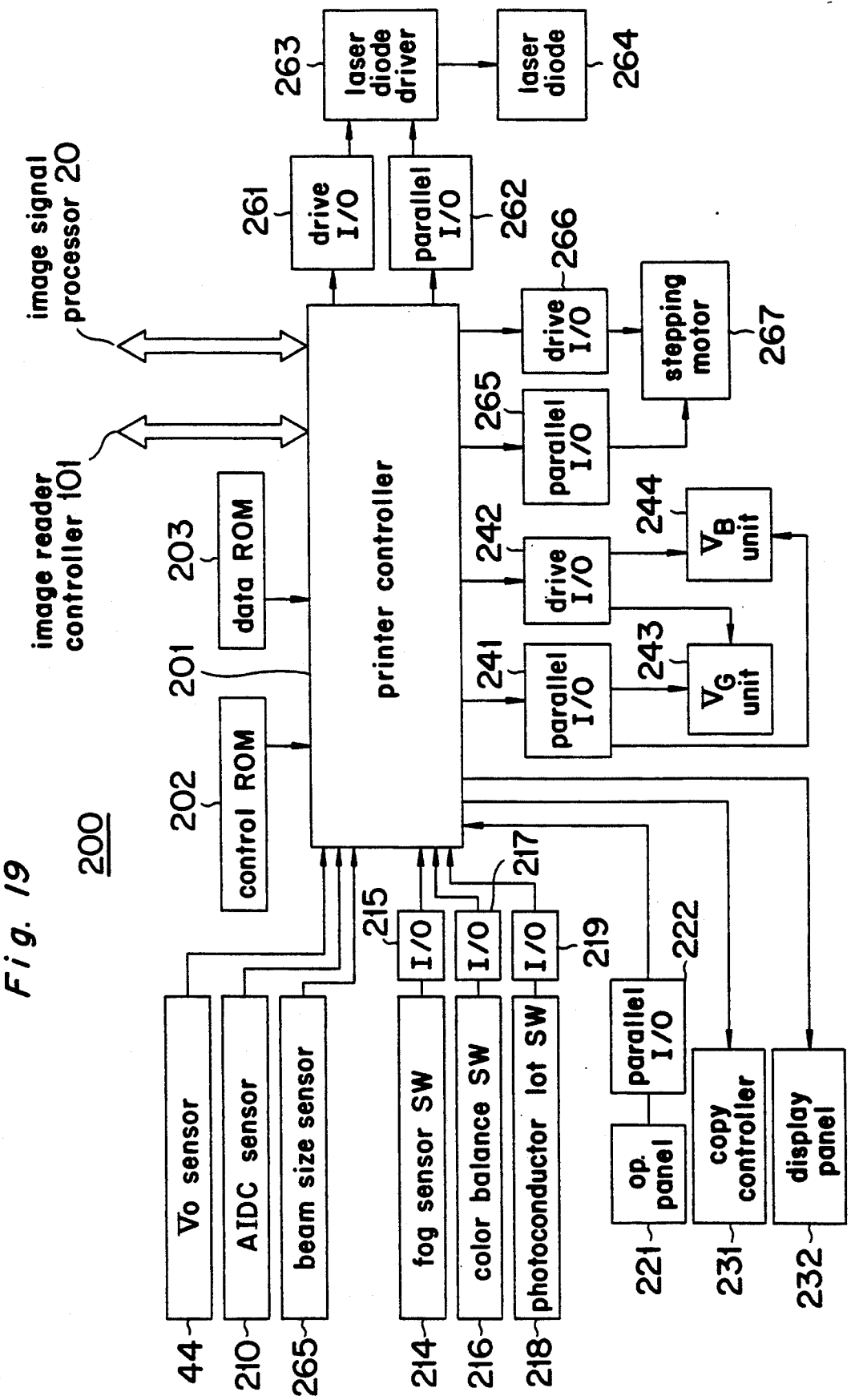
FIG. 19 is a block diagram of the other part of the control system of the copying machine.

FIGS. 18 and 19 show a whole block diagram of the control system of the digital color machine. The image reader 100 is controlled by an image reader controller 101. The controller 101 controls the exposure lamp 12 via a drive I/O 103 according to a position signal from a position detection switch 102 which indicates the position of a document on the platen 15 and controls a scan motor driver 105 via a drive I/O 103. The scan motor 11 is driven by the scan motor driver 105.

On the other hand, the image reader controller 101 is connected via a bus to an image controller 106. The image controller 106 is connected to the CCD color image sensor 14 and the image signal processor 20. The image signal from the CCD color image sensor 14 is processed by the image signal processor 20.

The printer section 200 includes a printer controller 201 for controlling the copying action and the print head 31. The printer controller 201 including a CPU is connected to a control ROM 202 storing a control program and a data ROM 203 storing various data. The printer controller 201 receives analog signals from various sensors 44, 210 for the automatic density control. Various data input with an operational panel 221 are sent to the printer controller 201 via a parallel I/O 222. The printer controller 201 controls a copying controller 231 and a display panel 232 according to the data from the operational panel 221 and the data ROM 203. Further, the printer controller 201 controls high voltage units 243 and 244 for generating the grid voltage $V_G$ of the sensitizing charger 43 and for generating the development bias voltage $V_B$ of the development unit 45a-45d.

The printer controller 201 is also connected to the image signal processor 20 of the image reader 100 via an image data bus and performs gamma correction on the basis of the image signal received via the image data bus with reference to a gamma correction table stored in the data ROM 203. Then, the print head controller 201 controls the laser diode driver 263 via the drive I/O 261 and a parallel I/O 262, and the laser diode driver 263 controls the emitting of the laser diode 264. The gradation is expressed by modulating the light-emitting intensity of the laser diode 264.

(F) Image Signal Processing

Figure 20:
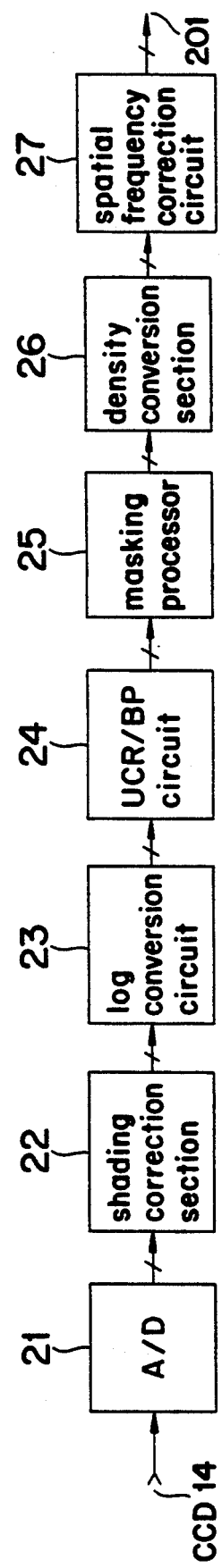
FIG. 20 is a block diagram of image signals in the image signal processor.

FIG. 20 shows a flow of image data processing in the image signal processor 20 of the printer controller 201, and the output data of the CCD sensor 14 is processed to send gradation data.

In the image signal processor 20, the image signal obtained by the photoelectric conversion by the CCD sensor 14 is converted to multi-value digital image data of R, G and B by an A/D converter 21. The converted image data is subjected to shading correction by a shading correction section 22, and then the image data is converted to density data according to logarithmic conversion by a log converter 23. Further, an excess black is removed from the R, G, B density data and a true black data K' is generated from the density data by an under color remove/black painting circuit 24. Then, the R, G, B density data are converted to data of cyan (C), magenta (M) and yellow (Y) by a masking circuit 25. Then, the C, M, Y data are multiplied with correction coefficients by a density correction circuit 26 and then corrected by a spatial frequency correction circuit 27. The processed data are sent to the printer controller 201.

Figure 21:
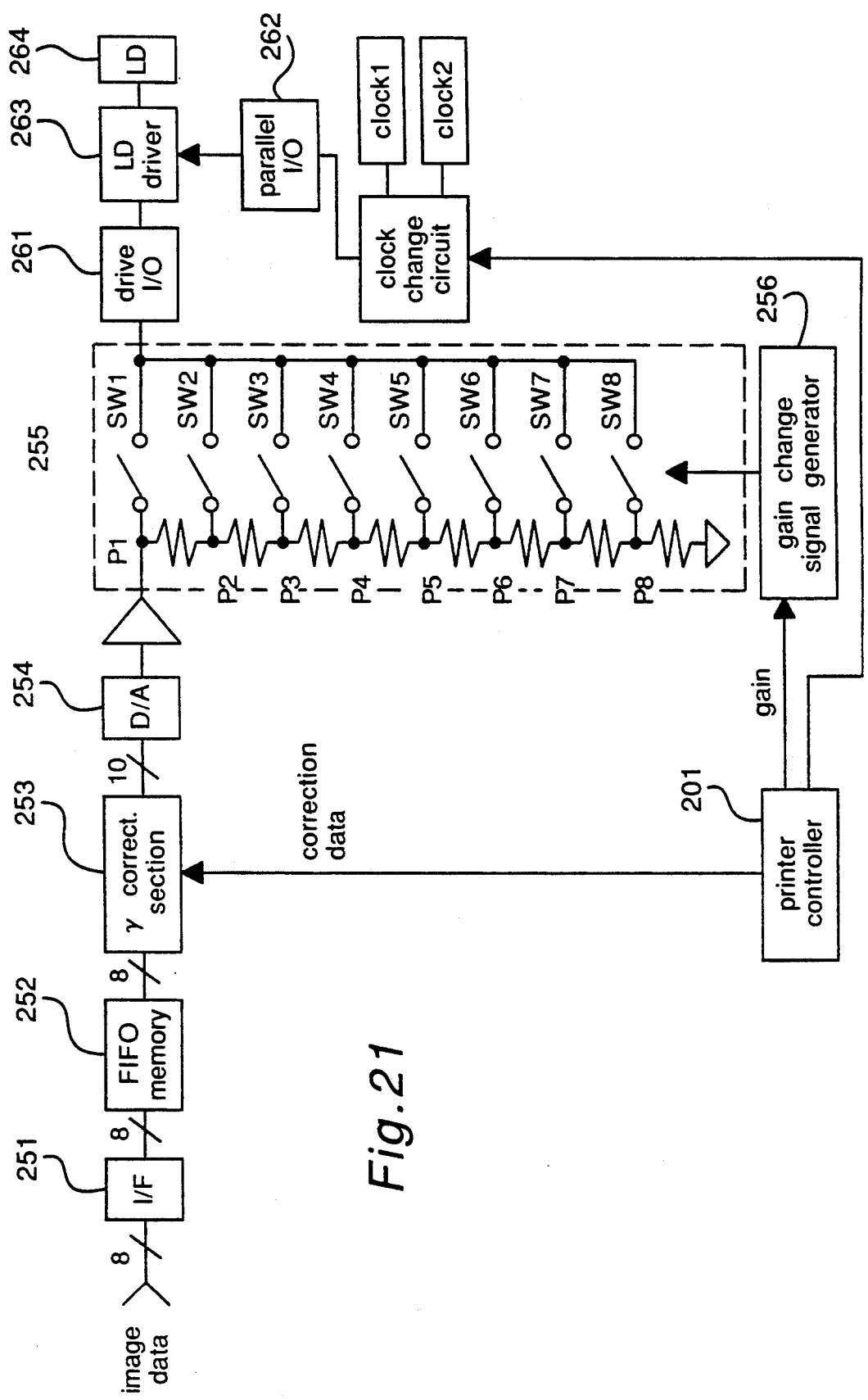
FIG. 21 is a block diagram of the image data processing in the printer controller.

FIG. 21 shows image data processing in the printer controller 201. An 8-bit image data received from the image signal processor 20 is received through an interface 251 and are stored in a first-in first-out (FIFO) memory 252. The FIFO memory 252 is a line buffer memory which can store gradation data of a prescribed line number in the main scan direction and it buffers the difference of the clock frequencies between the image reader 10 and the printer 200. The data in the FIFO memory 252 are input to a gamma correction section 253. Gamma correction data in the data ROM 203 are sent to the gamma correction section 253 by the printer controller 201, and the gamma correction section 253 corrects the input read data (ID) to send an output level to a D/A converter 254. The D/A converter 254 converts the digital input data to an analog voltage. The analog voltage is amplified in a gain switch 255 according to a gain set by changing a switch SW1, SW2 or the like (in correspondence to the power P1, P2, or the like) by a gain switch signal generator 256. The amplified voltage is sent through a drive I/O 161 to the semiconductor laser (LD) driver 263 which drives the laser diode 264 to emit a light of an intensity in correspondence to the digital data.

On the other hand, the printer controller 201 sends a signal to a clock switch circuit 257 to select a clock generator 258 or 259, which sends clock signals via a parallel I/O 262 to the laser diode driver 263 for the modulation of image data with the clock signals. Further, the stepping motor 267 of the beam expander is controlled by the printer controller 201 via a parallel I/O 265 and a drive I/O 266.

(G) FLOW OF PRINTER CONTROL (G-1) Main Flow

Figure 23:
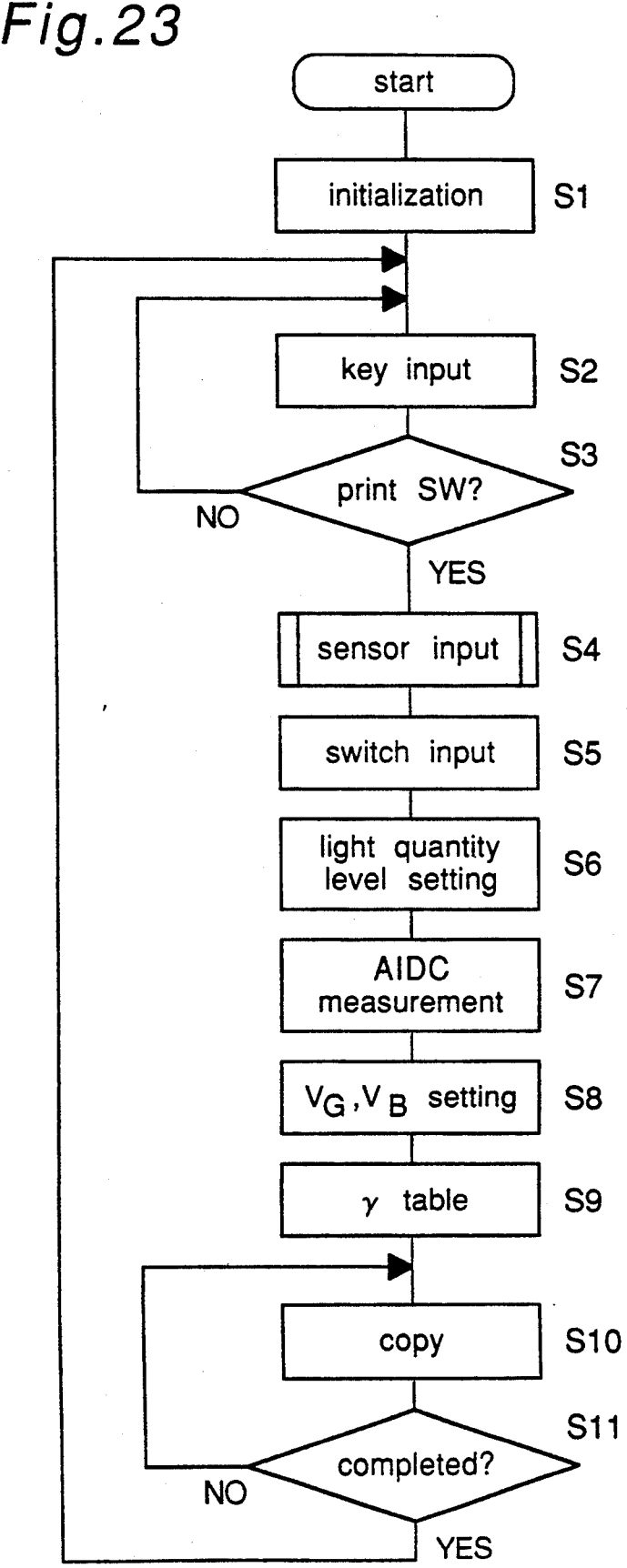
FIG. 23 is a flowchart of the control of the printer controller.

FIG. 23 shows a main flow of the printer controller 201. First at step S1, the printer controller 201 is initialized, and at step S2, the inputs from the operational panel 221 are processed.

Next, at step S3, it is decided if a start key in the operational panel 221 is pressed or not. If it is decided at step S3 that the start key is pressed, the sensor inputs are processed at step S4 (refer FIG. 24). Next, at step S5, the switch inputs are processed. Then, at step S6, the maximum level of the quantity of light of the laser beam is determined. Next, st step S7, the AIDC processing is performed. In the AIDC processing, after the grid voltage $V_G$ and the development bias voltage $V_B$ are set to be prescribed standard values, a toner image of a standard image pattern is formed on the photoconductor drum 41, the amount of adhered toners of the image is measured with the AIDC sensor 210 and it is stored in the RAM in the printer controller 201. Next, at step S8, the density detection level LBA is selected according to the amount of adhered toners measured at step S6, and the grid voltage $V_G$, the development bias voltage $V_B$ and the gamma correction table code Tss (ss=1-10) are selected from the AIDC table (Table 1) according to the density detection level LBA. Next, at step S9, the gamma correction table is read from the data ROM 203 according to the code Tss.

At step S10, a known copy action is carried out by using the grid voltage $V_G$, the bias voltage $V_B$ and the gamma correction table selected. Then, it is decided if the copy action completes or not at step S11. If the copy action is decided to complete, the flow returns to step S2, otherwise the flow returns to step S2.

(G-2) Sensor Input

FIG. 24 shows a flow of the sensor input processing (step S4 in FIG. 23). First, the surface potential $V_0$ is measured under no exposure light (step S71). Then, the surface potential $V_{i1}$ after exposed at a small quantity of light is measured (step S72), and the surface potential $V_{i2}$ measured after exposed at the maximum quantity of exposure light (step S73). Next, the residual potential $V_R$ is measured under no grid voltage $V_G$ (step S74). Then, the sensitivity constant "k" is calculated from $V_{i1}$ by using Eq. 10 (step S75), and the light quantity distribution constant "a" is obtained from $V_{i2}$ by using Eq. 11 (step S76).

Next, the correction value SP for the quantity of light is selected from the sensitivity constant "k" by using Table 3 (step S77), to adjust the change in the sensitivity constant. Further, the correction data SB for the development bias voltage $V_B$ is selected from the residual voltage $V_R$ by using Table 4, to adjust the change in the residual voltage $V_R$ so as to stabilize the gradation characteristic (step S78). Then, the correction data SV for the grid voltage $V_G$ is selected from the surface potential and the residual voltage by using Table 2, to make $V_0 - V_R$ constant (step S79).

Next, the beam size is controlled, as will be explained later in detail (step S80, refer FIGS. 25, 26, 28 and 29).

Finally, the development efficiency is measured (step S81), and the flow returns to the main flow. (It is to be noted that the measurement of the development efficiency is not needed in the first beam control method.)

The small quantity of light for measuring $V_{i1}$ is set to be less than (32/255) times the maximum quantity of light, wherein the maximum gradation number is 255. This makes use of that Eq. 11 is not affected by the beam size in a region of the linear approximation of the sensitivity curve. If better precision is needed, a precise value can be obtained by using the data of more measurement points and the multidimensional analysis. However, this simple method can give a sufficient precision with a short program.

(G-3) First Method of Beam Size Control

Figure 25:
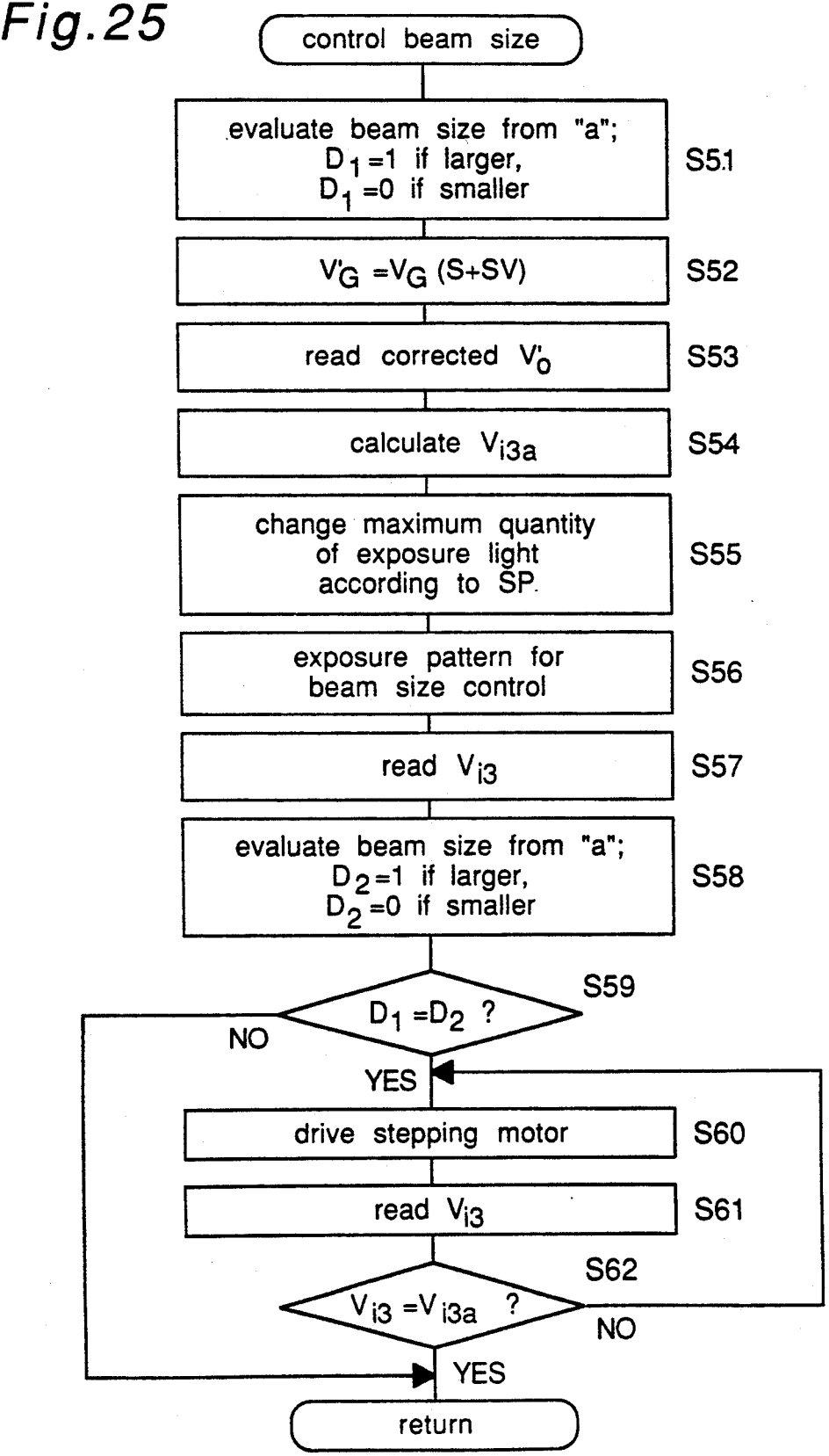
FIG. 25 is a flowchart of the first method of bema size control.

FIG. 25 shows a flow of the first method of beam control which is explained above in the (D-2) section. First, the maximum "a" of the light quantity distribution is compared with a desired value "aa". If the "a" value is larger than the desired value "aa", a flag D1 is set to be "1" so as to make the beam size narrower, otherwise the flag D1 is set to be "0" so as to make the beam size thicker (step S51).

Next, the grid voltage is changed to $V_G'$ according to the correction data SV (step S52). Further, the corrected grid voltage $V_G'$ is output and the surface potential $V_0'$ after the correction is detected (step S53). Then, the level of the quantity of exposure light (128 in FIG. 11) is set, and the desired value $V_{i3a}$ for the exposure at the level is calculated from $V_0'$, "k", $V_R$ and the maximum value "a" by using Eq. 12 (step S55). Next, the level of the quantity of exposure light is corrected according to the correction data SP (step S55).

Then, a pattern for beam size control is exposed at the corrected level (step S56), and the potential $V_{i3}$ after the exposure is read (step S57). Next, the potential $V_{i3}$ is compared with the desired value $V_{i3a}$. If $|V_{i3}|$ is larger than the desired value $|V_{i3a}|$, the flag D2 is set to be "0" because the beam size is narrower than the desired value, otherwise the flag D2 is set to be "1" (step S58). If the decision is different from the above-mentioned decision based on "a" at step S51 (NO at step S59), this flow returns to the main flow, because the beam size in not so different from the desired value. If the decision coincides with the above-mentioned decision at step S51, the stepping motor 267 for controlling the focus of the beam expander 268 is moved by one step to change the beam size (step S60), and the surface potential $V_{i3}$ is read (step S61). This procedure is repeated until the value $V_{i3}$ attains the desired value $V_{i3a}$ (YES at step S62). Thus, the beam size is controlled to the desired one, and the beam control is completed.

Figure 26:
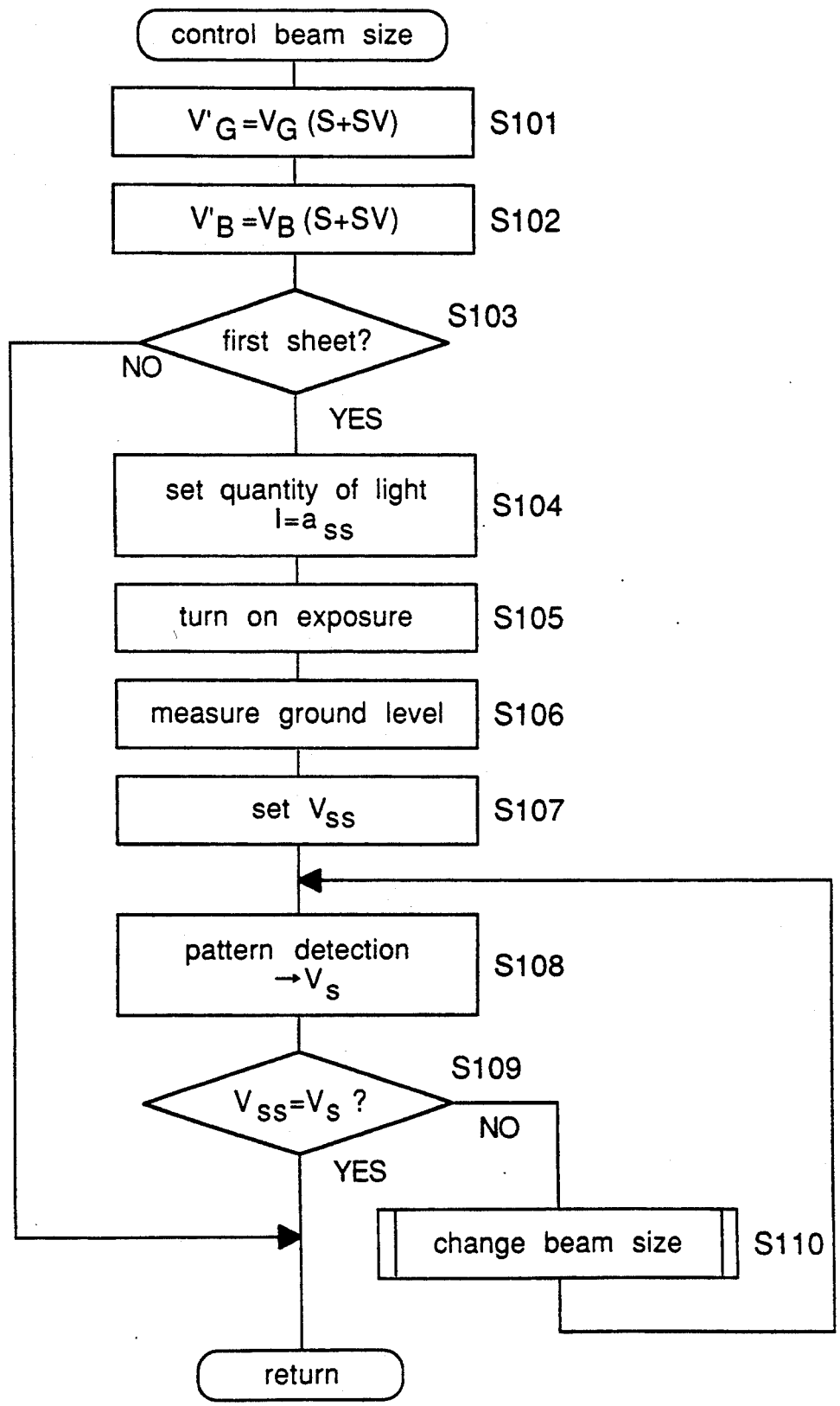
FIG. 26 is a flowchart of the second method of bema size control.

(G-4) Second Method of Beam Control (G-4-1) First of the second beam size control methods FIG. 26 shows a flow of the second beam size control method (step S80) explained above in the section (D-2-1). First, conditions for potential measurement are set. That is, the surface potential is output with a grid voltage $V_G'=V_G(S+SV)$ (step S101), while the development bias voltage is output as $V_B'=V_B(S+SV)$ (step S102), wherein "S" denotes the initial value.

Next, if the copy is decided not to be a first sheet of multi-copy (NO at step S103), the flow returns because the beam size has already been controlled.

Next, the quantity of light "I" for exposure is set to be a little higher than the desired quantity of light "$a_{sm}$" at which an image starts to be adhered with toners while the quantity of light is increased (step S104).

Then, the quantity of light for image reproduction is measured. That is, the exposure is performed in the above-mentioned conditions (step S105), the ground level $V_{so}$ is measured (step S106), and the threshold level $V_{ss}=V_{so}+dV_s$ for exposure is set (step S107). Next, a pattern exposed at a quantity of light "$a_{ss}$" is developed, and the amount of adhered toners is measured with the AIDC sensor 210 and the output voltage $V_s$ of the AIDC sensor 210 is read (step S108).

Next, it is decided for beam size control if $V_{ss}$ is equal to $V_s$ (step S109). If they are decided not equal to each other, the beam size is controlled (step S110, refer FIG. 26), and the flow returns to step S108. This procedure is repeated until the amount of adhered toners agree with the desired value.

Figure 27:
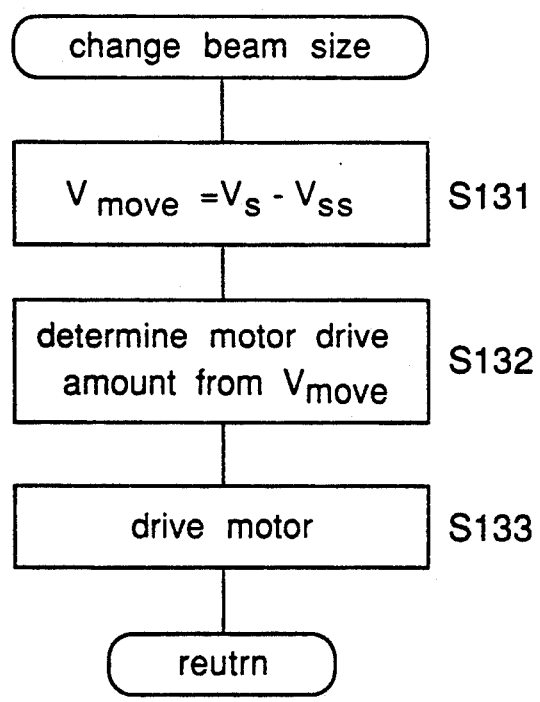
FIG. 27 is a flowchart of the change of the beam size.

FIG. 27 shows a flow of the beam size control (step S110 in FIG. 26). First, $V_{move}=V_s-V_{ss}$ is obtained (step S131), and the amount for driving the motor 267 of the beam expander 268 is determined from $V_{move}$ (step S132). If the amount of the adhered toners is larger than the desired value, the motor 267 is moved by one step in a direction for making the beam size thicker, otherwise the motor 267 is moved by one step in the reverse direction. Then, the motor 267 is driven according to the motor driving amount (step S133).

(G-4-2) Second of the second beam size control methods

Figure 28:
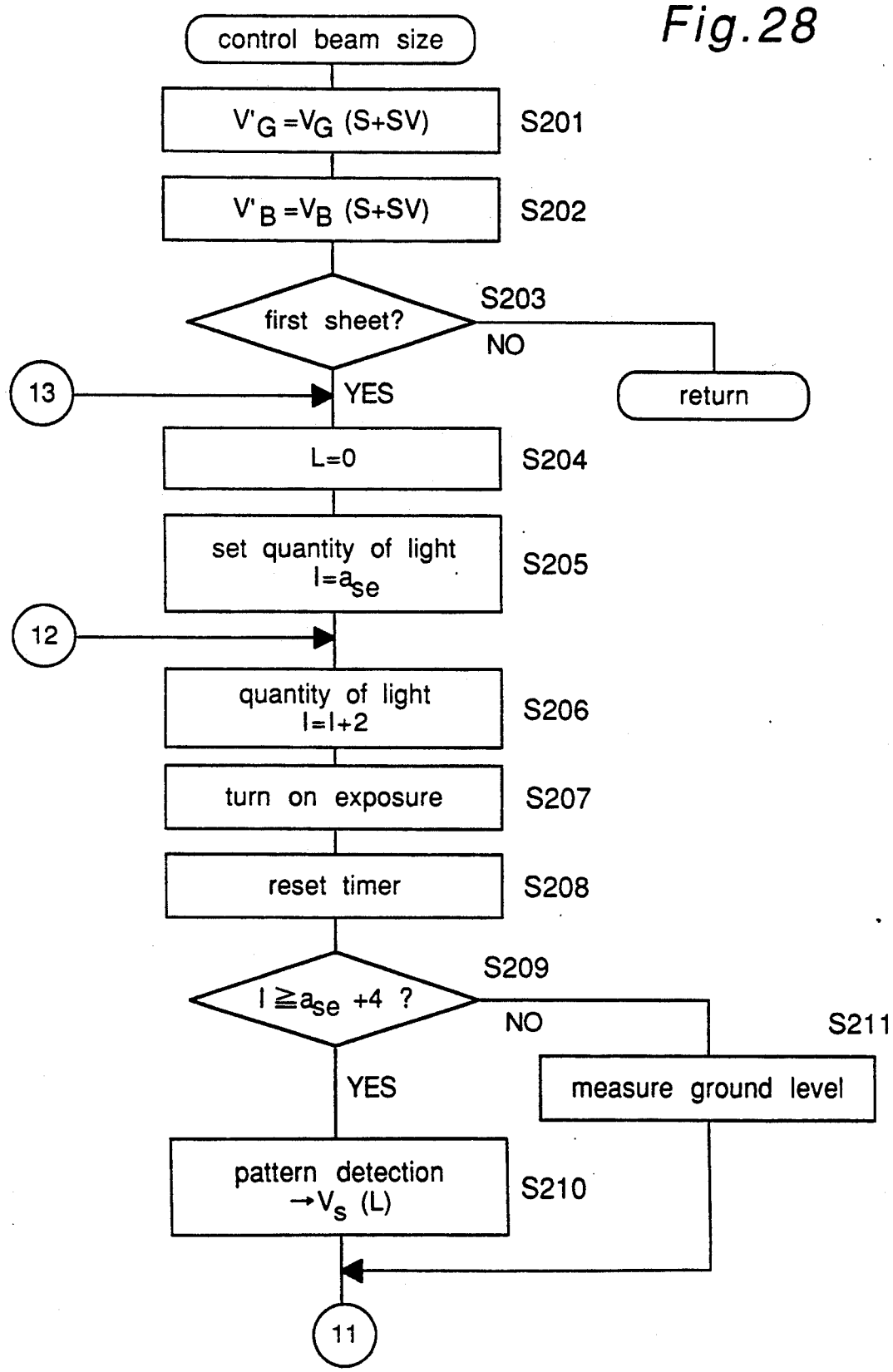
FIG. 28 is a flowchart of development efficiency measurement.
Figure 29:
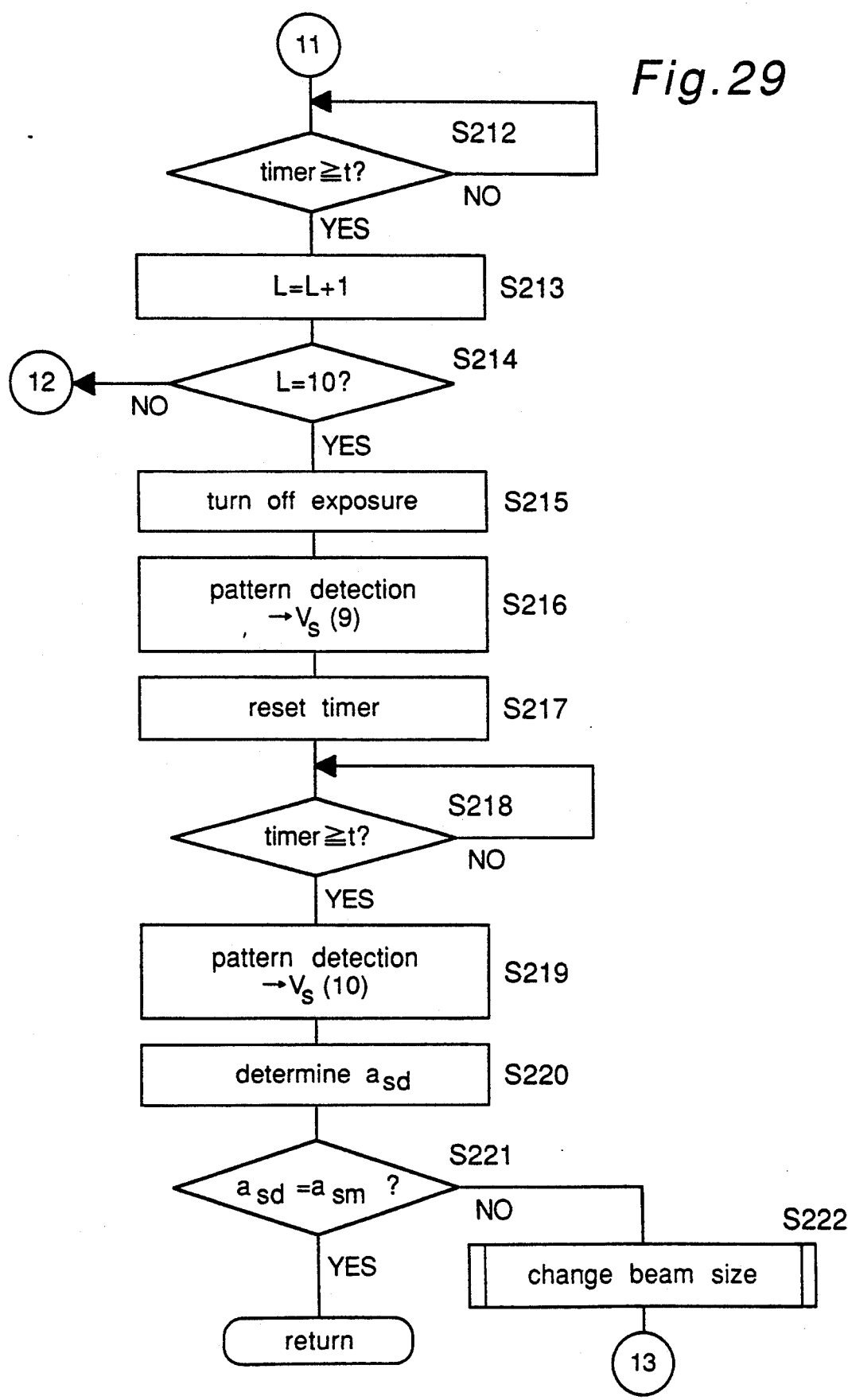
FIG. 29 is a flowchart of a part of the third method of beam size control.

FIGS. 28 and 29 show a flow of the second of the second beam size control methods (step S80) explained above in the section (D-2-2). First, the surface potential $V_0$ is set as $V_G'=V_G(S+S_V)$ (step S201), and the development bias voltage $V_B$ is set as $V_B=V_B(S+SV)$ (step S202), wherein S denotes the initialized value.

Next, if the copy is decided not to be a first sheet of multi-copy (NO at step S203), the flow returns because the beam size has already been controlled.

Next, after L is set to be zero (step S204), the quantity of light "I" for exposure is set to be "$a_{se}$" which is a little lower than the desired quantity of light "$a_{sm}$" at which an image starts to be adhered with toners (step S205).

Then, the quantity of light for reproducing an image is measured. That is, the level of the quantity of light is increased by two to I+2 (step S206), and the exposure is performed in the above-mentioned conditions (step S207). Next, a timer is reset (step S208).

Next, the surface potential $V_{so}$ at the ground level is measured (step S210) until the quantity of light "I" attains "$a_{se}$"+4 (NO at step S209). That is, the ground level is read before a first pattern is read by utilizing the time difference between the exposure and the detection.

On the other hand, if the quantity of light "I" attains "$a_{se}$"+4 or more (YES at step S209), the pattern exposed at the quantity of light "I" is developed, the amount of adhered toners is measured, and the level $V_s(L)$ in correspondence with the amount of adhered toners is measured with the AIDC sensor 210 (step S211).

After the timer attains a predetermined value "t" (YES at step S212), L is incremented (step S213). If it is decided if L does not attain ten (NO at step S214), the flow returns to step S206 and the quantity of light is increased to detect $V_s(L)$.

If L is decided to be ten (YES at step S214), the exposure is stopped (step S215). The pattern is continued to be read because of the time lag between the exposure and the detection. That is, the pattern is developed, the amount of the adhered toners is measured and the level $V_s(9)$ for the amount of adhered toners is determined (step S216).

Next, the timer is reset (step S217). After the timer increases to "t" (YES at step S218), the pattern exposed at the quantity of light "I" is developed, the amount of the adhered toners is measured and the level $V_s(10)$ for the amount of adhered toners is determined (step S219).

Figure 31:
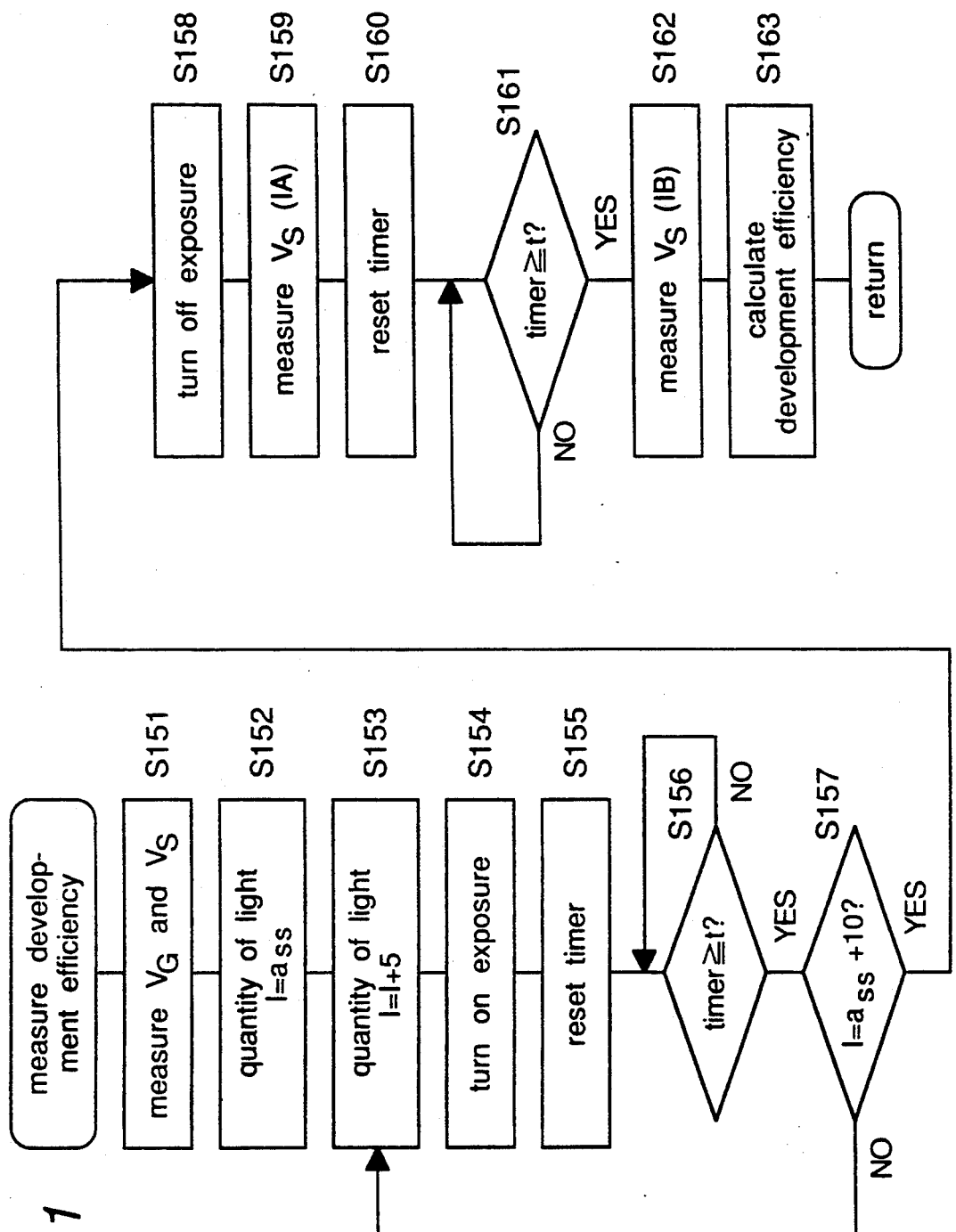
FIG. 31 is a flowchart of the change of the beam size.

Then, the quantity of light "$a_{sd}$" at which an image is started to be reproduced is determined according to the quantity of light at which the measured value $V_s(L)$ exceeds the threshold level $V_{ss}=V_{so}+V_{sd}$ (step S220). Next, it is decided if "$a_{sd}$" is equal to "$a_{sm}$" or not for the beam size control (step S221). If "$a_{sd}$" is decided not equal to "$a_{sm}$" (NO at step S221), the beam size is controlled (step S222, refer FIG. 31), and the flow returns to step S204. This procedure is repeated until "$a_{sd}$" becomes equal to the desired value "$a_{sm}$".

Figure 30:
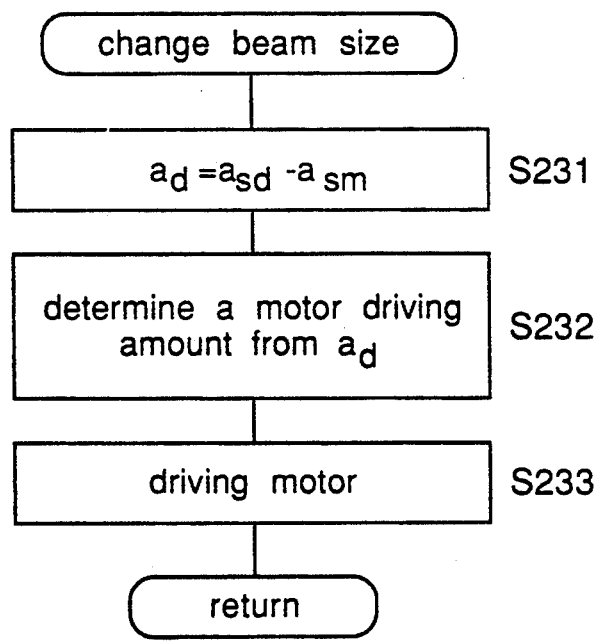
FIG. 30 is a flowchart of the other part of the third method of beam size control.

FIG. 30 shows a flow of the beam size control (step S222 in FIG. 29). First, $a_d=a_{sd}-a_{sm}$ is calculated (step S231), and the motor driving amount of the beam expander 268 is determined from "$a_d$" (step S232). If the amount of adhered toners exceeds the desired value, the motor driving amount is changed by one step in the direction to make the beam size thicker. Otherwise, the motor driving amount is changed by one step in the reverse direction. Then, the motor 267 is driven according to the motor driving amount (step S233).

The motor is moved by one step in the above-mentioned flow. However, if the number of the steps is increased with increasing difference "$a_d$", the beam size can be controlled more effectively. Table 5 shows a table for determining the motor driving amount "$a_d$".

IF "$a_d$" is positive, the beam size is thicker, and the number of steps is determined so as to decrease the beam size, while if "$a_d$" is negative, the number of steps is determined so as to increase the beam size. It is preferable that the number of steps is determined at step S232 with reference to Table 5.

(G-5) Measurement of Development Efficiency

FIG. 30 shows a flow of the development efficiency measurement (step S81 in FIG. 24). First, $V_G$ and $V_B$ are set (step S151), and the quantity of light "I" is set as "$a_{ss}$" (step S152).

Then, the level of the quantity of light is increased by five (step S153) and the exposure is performed (step S154). Next, a timer is reset (step S154), and after the timer attains a predetermined value "t" (YES at step 156), it is decided if the quantity of light is "$a_{ss}$"+10 or not (step S157), and if the decision is NO, the flow returns to step S153 for a further exposure. Otherwise (YES at step S157) the exposure is stopped (step S162), and the pattern is detected to get a measured value $V_s$(IB) (step S163). Thus, the detection values of a number sufficient for the calculation are obtained.

Next, the difference of the sensor outputs is obtained by using Eq. 16, and the development efficiency is calculated by using Eq. 15.

TABLE 5

| $a_d$ | number of steps |
|---|---|
| −12−−11 | −25 |
| −10−−9 | −17 |
| −8−−7 | −12 |
| −6−−5 | −7 |
| −4−−3 | −3 |
| −2−−1 | −1 |
| 0−+1 | 0 |
| +2−+3 | +1 |
| +4−+5 | +3 |
| +6−+7 | +7 |
| +8−+9 | +12 |
| +10−+11 | +17 |
| +12 or more | +25 |

In the second of the second beam size control methods, at least three sensor output values are measured above the quantity of light at which toners start to be adhered with increasing light intensity, and the development efficiency can be calculated from the obtained data.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for forming a digital image, comprising:
    a photoconductor;
    an exposure means for emitting a beam to expose the photoconductor;
    a drive means for driving the exposure means so as to modulate the intensity of the beam according to multi-level image data;
    a detection means for detecting the surface potential of the photoconductor;
    a change means for changing the size of the beam for exposing the photoconductor; and
    a control means for making the detection means to detect the surface potential of the photoconductor exposed with the beam and for making the beam size change means to change the beam size according to the surface potential detected by the detection means.

2. The apparatus according to claim 1, wherein said change means includes a beam expander located in the optical path of the beam.

3. The apparatus according to claim 1, wherein said control means controls the beam size before the exposure of the photoconductor according to the image data.

4. An apparatus for forming a digital image, comprising:
    a photoconductor;
    an exposure means for emitting a beam to expose the photoconductor;
    a drive means for driving the exposure means so as to modulate the intensity of the beam according to multi-level image data;
    a detection means for detecting the surface potential of the photoconductor;
    a change means for changing the size of the beam for exposing the photoconductor;
    a calculation means for calculating the surface potential of the exposed area when the photoconductor is exposed with a beam of a desired size; and
    a control means for making the detection means to detect the surface potential of the photoconductor exposed with the beam and for making the change means to change the beam size according to the surface potential detected by the detection means until the detected surface potential attains the surface potential calculated by the calculation means.

5. The apparatus according to claim 4, wherein said change means includes a beam expander located in the optical path of the beam.

6. The apparatus according to claim 4, wherein said control means controls the beam size before the exposure of the photoconductor according to the image data.

7. An apparatus for forming a digital image, comprising:
    a photoconductor;
    an exposure means for emitting a beam to expose the photoconductor;
    a drive means for driving the exposure means so as to modulate the intensity of the beam according to multi-level image data;
    a sensitizing means for sensitizing the photoconductor at a potential, which potential being able to be changed by the sensitizing means;
    a development means for developing a latent image formed on the photoconductor;
    a detection means for detecting the surface potential of the photoconductor;
    a change means for changing the size of the beam for exposing the photoconductor;
    a determination means for determining the sensitizing potential for the control of the beam size;
    a calculation means for calculating the surface potential of the exposed area when the photoconductor sensitized at the sensitizing potential determined by the determination means is exposed with a beam of a desired size; and
    a control means for making the sensitizing means sensitize the photoconductor at the sensitizing potential determined by the determination means, for making the detection means to detect the surface potential of the photoconductor exposed after sensitized at the sensitizing potential and for making the change means to change the beam size according to the surface potential detected by the detection means until the detected surface potential attains the surface potential calculated by the calculation means.

8. The apparatus according to claim 7, wherein said change means includes a beam expander located in the optical path of the beam.

9. The apparatus according to claim 7, wherein said control means controls the beam size before the exposure of the photoconductor according to the image data.

10. An apparatus for forming a digital image, comprising:

a photoconductor;

an exposure means for emitting a beam to expose the photoconductor;

a drive means for driving the exposure means so as to modulate the intensity of the beam according to multi-level image data;

a sensitizing means for sensitizing the photoconductor at a potential, which potential being able to be changed by the sensitizing means;

a development means for developing a latent image formed on the photoconductor;

a detection means for detecting the density of the image developed by the development means;

a change means for changing the size of the beam for exposing the photoconductor;

a determination means for determining the sensitizing potential for the control of the beam emitted by the exposure means; and a control means for making the drive means to expose the photoconductor sensitized at a prescribed uniform voltage by the sensitizing means at a quantity of light, for making the detection means to detect the density of the developed image on the photoconductor and for making the change means to change the beam size according to the density detected by the detection means.

11. The apparatus according to claim 11, wherein said change means includes a beam expander located in the optical path of the beam.

12. The apparatus according to claim 11, wherein said control means controls the beam size before the exposure of the photoconductor according to the image data.

* * * * *